United States Patent
Matsuda et al.

(10) Patent No.: US 6,822,783 B2
(45) Date of Patent: Nov. 23, 2004

(54) ELECTROPHORETIC DISPLAY UNIT, AND DRIVING METHOD THEREOF

(75) Inventors: Yojiro Matsuda, Kanagawa (JP); Nobutaka Ukigaya, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 122 days.

(21) Appl. No.: 10/176,585

(22) Filed: Jun. 24, 2002

(65) Prior Publication Data

US 2003/0011869 A1 Jan. 16, 2003

(30) Foreign Application Priority Data

Jun. 26, 2001 (JP) ........................ 2001/193749
Jun. 26, 2001 (JP) ........................ 2001/193751

(51) Int. Cl.⁷ .................. G02B 26/00; G09G 3/34; G03G 17/04; G01R 1/12
(52) U.S. Cl. ................ 359/296; 345/107; 430/32; 204/600
(58) Field of Search ................ 359/296, 297; 345/107, 105; 204/600, 450; 430/32, 34, 38

(56) References Cited

U.S. PATENT DOCUMENTS

| | | | |
|---|---|---|---|
| 3,612,758 A | 10/1971 | Evans et al. | 348/803 |
| 4,203,106 A | 5/1980 | Dalisa et al. | 345/107 |
| 5,345,251 A | 9/1994 | DiSanto et al. | 345/107 |
| 6,072,621 A | 6/2000 | Kishi et al. | 359/296 |
| 6,221,267 B1 | 4/2001 | Ikeda et al. | 216/24 |
| 6,639,580 B1 * | 10/2003 | Kishi et al. | 345/107 |

FOREIGN PATENT DOCUMENTS

| | | |
|---|---|---|
| JP | 49-5598 | 2/1974 |
| JP | 49-24695 | 3/1974 |
| JP | 61-16074 | 4/1986 |
| JP | 8-507154 | 7/1996 |
| JP | 2740048 | 1/1998 |
| JP | 11-202804 | 7/1999 |

* cited by examiner

Primary Examiner—Scott J. Sugarman
Assistant Examiner—Tuyen Tra
(74) Attorney, Agent, or Firm—Fitzpatrick, Cella, Harper & Scinto

(57) ABSTRACT

An electrophoretic display unit has a first substrate and a second substrate counterposed with an interspace, an insulating liquid placed in the interspace, and colored charged electrophoretic particles dispersed in the insulating liquid. A stage is formed in the interspace on the second substrate, with the stage having a first surface facing a thick layer portion of the insulating liquid, a second surface facing a thin layer portion of the insulating liquid, and a side wall surface of the stage connecting the first surface and the second surface. A first display electrode is placed along the first surface, a second display electrode is placed along the second electrode, and a third electrode is placed under the second electrode. An end portion of the third portion is proximate to the side wall surface at a substantially constant distance from the first electrode and the second electrode.

16 Claims, 38 Drawing Sheets

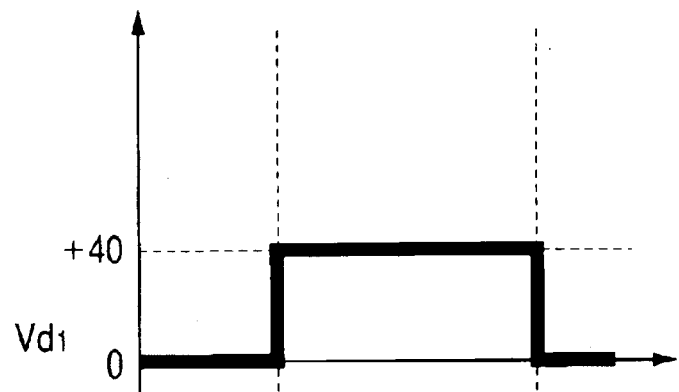
FIG. 14A  Vd1
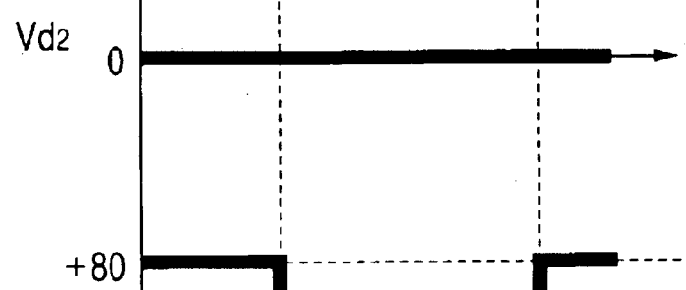
FIG. 14B  Vd2
FIG. 14C
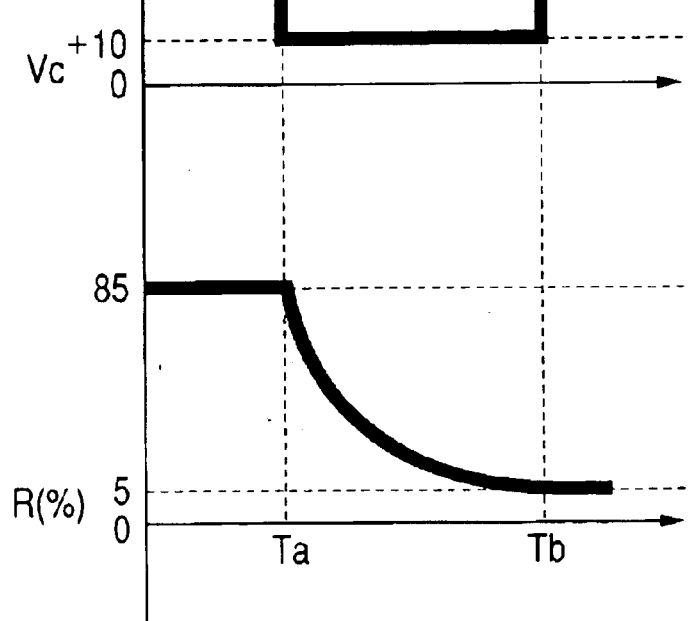
FIG. 14D

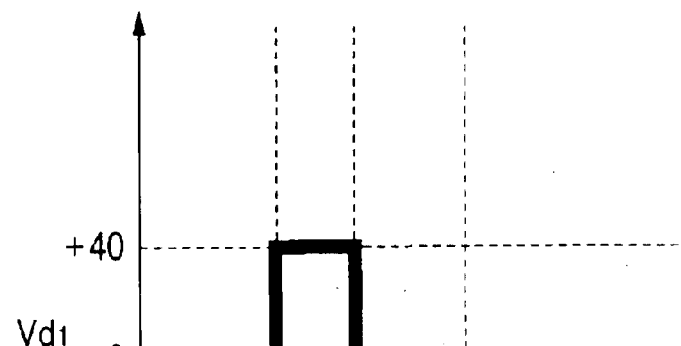
FIG. 17A
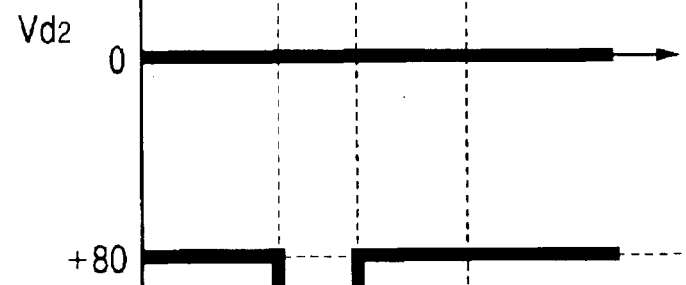
FIG. 17B
FIG. 17C
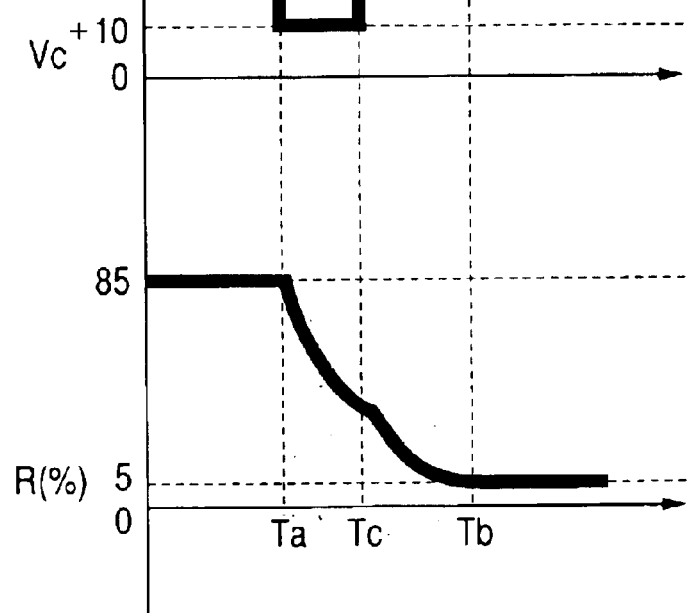
FIG. 17D

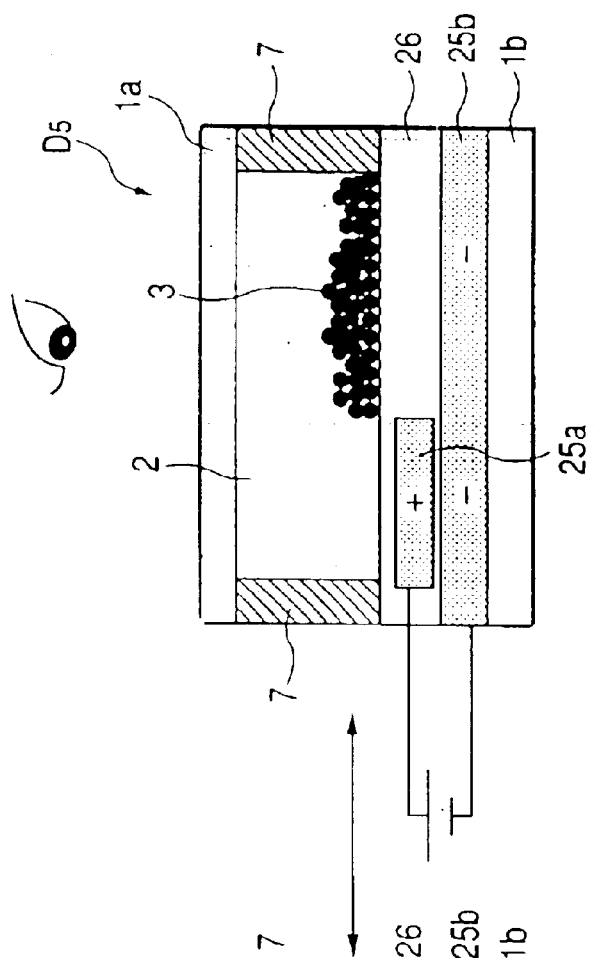
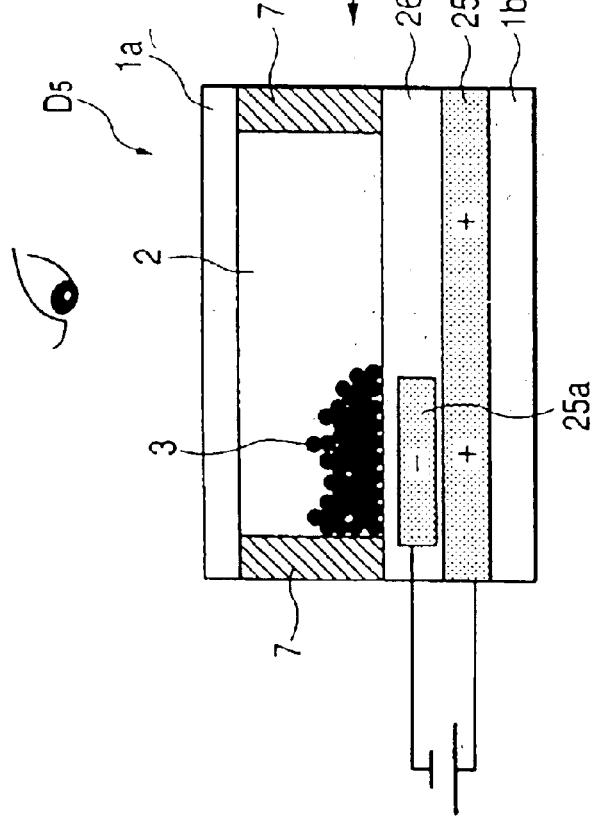

FIG. 34A
FIG. 34B
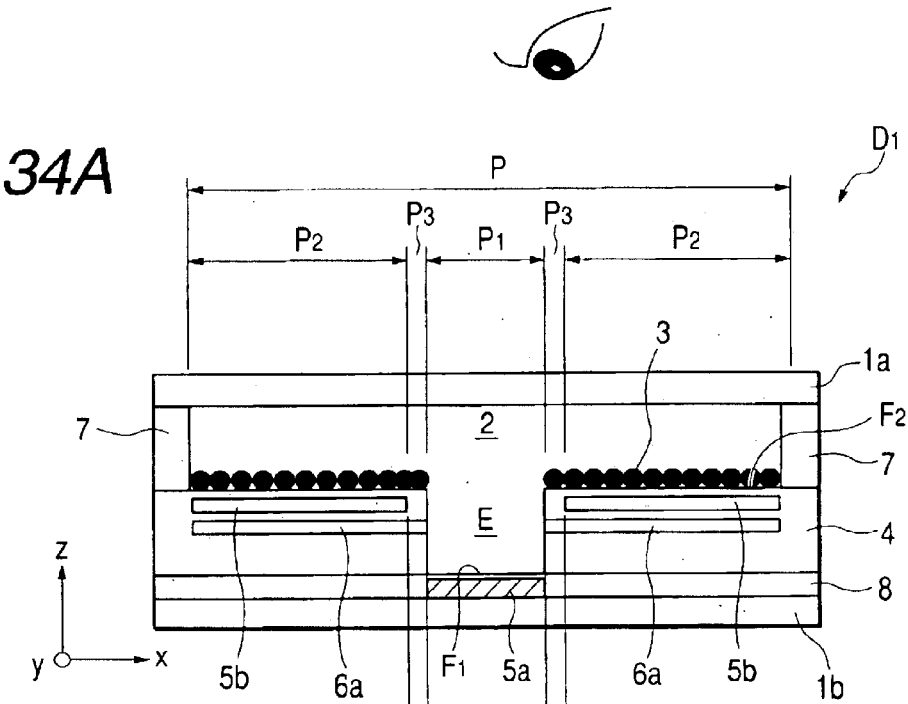
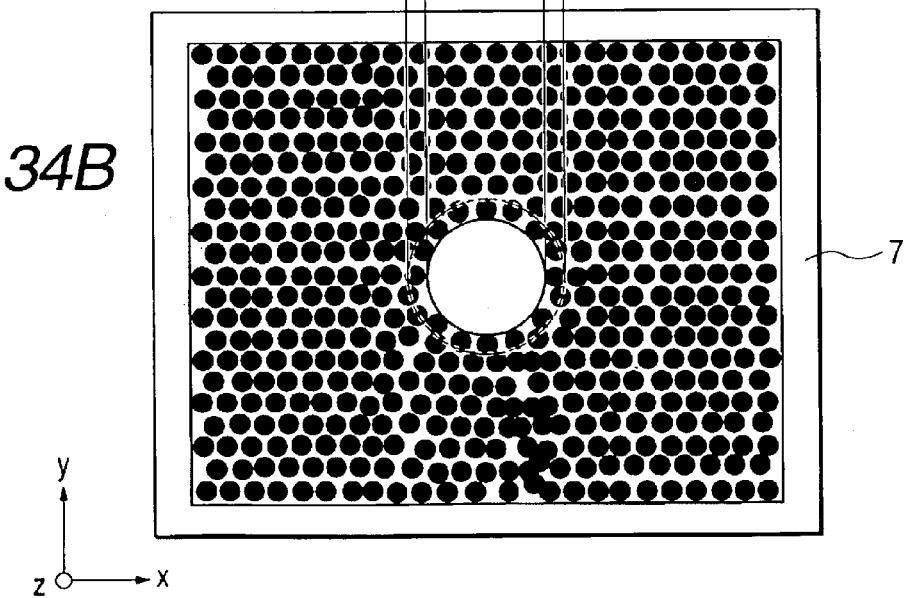

ELECTROPHORETIC DISPLAY UNIT, AND DRIVING METHOD THEREOF

BACKGROUND OF THE INVENTION

1. Field of the Invention

The present invention relates to an electrophoretic display unit which utilizes migration of charged electrophoretic particles for displaying an image, and to a method for driving the display unit.

2. Related Background Art

In recent years, with remarkable progress of digital techniques, the amount of information which individual persons can deal with is dramatically increasing. With this technical progress, display units are being developed for less power consumption and a smaller thickness of the unit. Of the display units, liquid crystal display units can meet the above needs, and are developed energetically and have been commercialized. However, conventional liquid crystal display units have problems such that the displayed letters may be not readily readable depending on the viewing angle or light reflection, and heavy visual load due to the flickering or insufficient brightness of a light source. Such problems are not solved yet. Therefore, reflection type display units are expected to be promising.

One example is an electrophoretic display unit disclosed by Harold D. Lees et al. (U.S. Pat. No. 3,612,758).

FIG. 27A illustrates an example of the structure of the electrophoretic display unit. This kind of electrophoretic unit has a pair of substrates 1a, 1b counterposed with a prescribed interspace, an insulating liquid filled between the substrates 1a, 1b, many colored charged electrophoretic particles 3 dispersed in the insulating liquid 2, and display electrodes 15a, 15b placed respectively on the substrates 1a, 1b of the respective pixels. Partitioning walls 7 are provided between the pixels to prevent migration of colored charged electrophoretic particles 3 to other pixels to enable uniform display. In this display unit, colored charged electrophoretic particles 3, which are charged positively or negatively, are adsorbed onto the display electrode 15a or 15b depending on the polarity of the voltage applied to display electrodes 15a, 15b. Insulating liquid 2 and colored charged electrophoretic particles 3 have different colors. With colored electrophoretic particles 3 adsorbed onto display electrode 15a at the observer side, the color of particles 3 is visually recognizable (FIG. 27B), whereas, with colored electrophoretic particles 3 adsorbed onto display electrode 15b at the other side, the color of insulating liquid 2 is visually recognizable (FIG. 27A). Therefore, various images can be displayed by controlling the polarity of the applied voltage for each of the pixels. This type of display unit is classified herein as a "vertical migration type".

However, in the vertical migration type electrophoretic device, insulating liquid 2 should contain a colorant such as a dye or an ionic substance. The colorant contained is liable to cause instability in the electrophoresis operation by additional charge transfer, which may lower the performance, life, or stability of the display unit.

To solve such problems, electrophoretic display units shown in FIGS. 28A and 28B are disclosed in Japanese Patent Application Laid-Open Nos. 49-5598, 49-024695, and 11-202804 (hereinafter referred to as "horizontal migration type electrophoretic display units"). Such a horizontal migration type electrophoretic display unit has also a pair of substrates 1a, 1b, insulating liquid 2 filled between the substrates 1a, 1b, many colored charged electrophoretic particles 3 dispersed in the insulating liquid 2, and a pair of display electrodes 25a, 25b for each of the pixels. However, the pair of display electrodes 25a, 25b are not placed to hold insulating liquid 2 therebetween unlike the aforementioned type, but are placed on one substrate 1b. In such a horizontal migration type electrophoretic display unit, insulating liquid 2 should be transparent but need not contain a colorant, thereby avoiding the aforementioned problems. In this display unit, one display electrode 25a is coated with a colored layer having the same color as charged electrophoretic particles 3 (e.g., black), and the other display electrode 25b is coated with another color (e.g., white). The colored electrophoretic particles 3 migrate horizontally (in the direction parallel to the substrate) in accordance with the polarity applied to display electrodes 25a, 25b, and are adsorbed by display electrode 25a or 25b. With charged electrophoretic particles 3 adsorbed by display electrode 25a, the color of display electrode 25b is visually recognizable more readily (FIG. 28A), whereas with charged electrophoretic particles 3 adsorbed by display electrode 25b, the entire pixel is visually recognizable to have the color of electrophoretic particles 3 (FIG. 28B). Accordingly, various images can be displayed by controlling the polarity of the applied voltage for each of the pixels.

The systems for electrical addressing the display unit having the pixels arranged in a matrix are roughly classified into two systems: active matrix systems and simple matrix systems.

In the active matrix system, a switching element such as a thin film transistor (TFT) is formed in each of the pixels, and the voltage applied to the pixel is controlled independently for each of the pixels. With this system, the horizontal migration type electrophoretic display unit can be driven with a high display contrast. However, this active matrix system has disadvantages of a high cost for processing, and difficulty in formation of thin film transistor on a polymer substrate owing to the high process temperature. These disadvantages are serious especially in formation of a paper-like display for low-cost flexible display. For offsetting such disadvantages, are proposed a process for thin film transistor by use of a polymer material applicable to a printing process, and a process of TFT transfer system which does not need heating of the substrate. However, the possibility of commercialization is not sure.

On the other hand, in the simple matrix system, the necessary constitutional elements for addressing are X-Y electrode lines only. Therefore, this system is of low cost and can be formed on a polymer substrate. For application of a writing voltage to a selected pixel, the voltage for writing is applied to the X electrode line and the Y electrode line crossing at the selected pixels. However, if the electrophoretic display unit is driven by the simple matrix system, the writing can be made also in a part of neighboring pixels around the selected pixels (so-called crosstalk phenomenon) to lower the display contrast significantly. This is caused necessarily, because the electrophoretic display unit does not have a precise threshold to the writing voltage.

To solve this problem in the electrophoretic display having no threshold voltage in principle, a method is disclosed in which the simple matrix is driven by employing a control electrode in addition to the pair of electrodes as a three-electrode system.

Most of the disclosures on the three-electrode system relate to vertical migration type electrophoretic display unit such as the one disclosed in Japanese Patent Publication No. 61-016074 (U.S. Pat. No. 4,203,106).

The three-electrode system for the horizontal migration type electrophoretic display unit is disclosed only in Japanese Patent Gazette No. 02,740,048 (U.S. Pat. No. 5,345, 251, Japanese Patent Application International Publication No. 8-507154). In the disclosed system, according to the above Patent Gazette, insulating liquid 2 employed is considered to be not transparent, but to be colored. Therefore, this system is different from the ones of the horizontal migration type electrophoretic display unit disclosed in the aforementioned Japanese Patent Laid-Open Nos. 49-5598 and 11-202804, and the display unit of the present invention in which the insulating liquid is transparent.

Japanese Patent Gazette No. 02,740,048 discloses two constitutions (a first constitution and a second constitution) for the arrangement of the control electrode. In the first constitution, the control electrode (grid line) is placed, as indicated by symbol 36a in FIG. 29A, on rear plate 1a counterposed to face plate 1b with an interspace of 25–116 $\mu$m. In FIG. 29A, the symbols indicate as follows: 35a, a cathode element; 35b, an anode element; 37, a chromium layer formed on the anode element; and 38, a photoresist formed on the chromium layer. Chromium layer 37 and photoresist 38 gives a level difference of about 0.3 $\mu$m at the boundary between cathode element 35a and anode element 35b.

In the second constitution, the control electrode (grid line) is placed, as indicated by symbol 36b in FIG. 29B, between cathode element 35a and anode element 35b on face plate 1b.

In any of the first constitution and the second constitution, fork-shaped cathode element 35a which is an assemblage of plural line electrodes, and fork-shaped anode element 35b which is an assemblage of plural line electrodes placed between the lines of cathode element 35a are placed on face plate 1b (see FIG. 30). In FIG. 30, cathode element 35a and anode element 35b are shown to be constituted respectively of one line for convenience of explanation.

The basic operation of the electrophoretic display unit (first constitution) shown in FIG. 29A is explained by reference to FIGS. 31A to 31C. In this case, charged electrophoretic particles 3 employed have a yellow color and are charged negatively.

On application of voltages of 0V to grid line 36a, 0V to anode element 35b, and about +12V to cathode element 35a, charged electrophoretic particles 3 migrate onto the surface of cathode element 35a to give a yellow display state of the pixel (FIG. 31A).

Then, on application of voltages of 0V to grid line 36a, +15V to anode element 35b, and 0V to cathode element 35a, charged electrophoretic particles 3 migrate to cover anode element 35b (FIG. 31B).

In the state shown in FIG. 31A, charged electrophoretic particles 3 are prevented from migration to anode element 35b by applying a negative voltage to grid line 36a as the write-inhibiting voltage (FIG. 31C).

On the other hand, in the second constitution shown in FIG. 29B, the migration of charged electrophoretic particles 3 between cathode element 35a and anode element 35b (writing in the pixel) can be inhibited by applying a write-inhibiting voltage to grid line 36b. In the pixel to which the write-inhibiting voltage is not applied, writing can be conducted by migration of charged electrophoretic particles 3 in accordance with the voltage applied to cathode element 35a and anode element 35b. In this second constitution, all of the constitutional elements for driving 35a, 35b including grid line 36b are placed on one and the same plate 1b, so that the registration can be simplified in the bonding of two plates 1a, 1b.

The horizontal migration type electrophoretic devices of the first constitution and the second constitution, however, have problems as shown below. FIGS. 32A and 32B and FIGS. 33A to 33C are drawings for explaining respectively the second constitution and the first constitution.

(1) Occurrence of Cross Talk

Cathode element 35a and anode element 35b extend on the first substrate in a direction perpendicular to the drawing sheet face to constitute line electrodes, and grid lines 36 are formed on the second substrate in the direction perpendicular to the line electrodes to form row electrodes.

In the first constitution, when different voltages are applied to the adjacent grid lines (control electrodes) 36a, 36a' (in FIGS. 33A to 33C, grid line 36a' is superposed on grid line 36a and is not shown), an interaction of the electric fields may be caused in the space including the adjacent grid lines 36a, 36b, disadvantageously. This is explained below in more detail. When a display voltage is applied to cathode element 35a and anode element 35b, a retaining voltage is applied to one 36a of the two adjacent grid lines to inhibit the migration of charged electrophoretic particles 3, and no retaining voltage is applied to the other grid line 36a', then charged electrophoretic particles 3 are expected to migrate smoothly in the pixel to which no retaining voltage is applied. However, unexpectedly, the charged electrophoretic particles 3 do not migrate smoothly owing to the influence of the retaining voltage-applied grid line 36a'. To solve the problem, one method is to lower the control voltage. However, this decreases the retention effect (inhibition of migration of charged electrophoretic particles 3) to cause cross talk.

(2) Increase of Power Consumption

In inhibition of migration of charged electrophoretic particles 3 by voltage application in an electrophoretic display unit having a less level difference, the particle migration as shown by symbol G2 in FIG. 33B can be prevented by increasing sufficiently the voltage applied to grid line 36a. However, the increase of the applied voltage causes other problems that power consumption increases, and the operation state of the charged electrophoretic particles 3 is unstable owing to the unintended electric field produced by remaining charge of the charge injected by high voltage into the insulating member in the element.

(3) Limitation in Display Contrast

In the first constitution, excessive level difference may retard the jump of the charged electrophoretic particles 3, even with application of a voltage between cathode element 35a and anode element 35b, leaving a part of the charged electrophoretic particles 3 in the bottom level (see G1 in FIG. 33A) to decrease the display contrast by insufficient number of the particles for covering anode element 35b. For solving the above problem, one method is to make the level difference to be not excessively high (nearly equal to the diameter of charged electrophoretic particles 3). However, with this method, the effect of the level difference in retardation of migration of charged electrophoretic particles is insufficient. Therefore, even if a voltage is applied to grid line 36a as shown in FIG. 33B to retard the migration of charged electrophoretic particles 3, a part of charged electrophoretic particles 3 can migrate over the level difference as shown by symbol G2 to cause cross talk phenomenon to lower the display contrast. This is a serious problem.

As described above, the decrease of the level difference may make the capacity of the hollow portion (the lower portion of cathode element 35a) insufficient for holding the entire charged electrophoretic particles 3 as shown by G3 in FIG. 33C and may cause overflow of the particles toward anode element 35b, resulting in decrease of the display contrast disadvantageously.

Another method to solve the problem with the decreased level difference is increase of the area of cathode element 35a to increase the capacity of the hollow. However, this method makes smaller the area ratio of the cathode element to the anode element, decreasing the display contrast disadvantageously.

In the electrophoretic display unit disclosed in Japanese Patent Application International Publication No. 8-507154, the display contrast is limited also by the electrode construction. As shown in FIG. 30, in the display unit, fork-shaped cathode element 35a and fork-shaped anode element 35b are placed in counterposition in the same level on face plate 1b. For the insulation, the elements should be separated at a certain distance. The separation decreases necessarily the element area (occupation area of cathode element 35a and anode element 35b) in one pixel, resulting in decrease of the display contrast disadvantageously.

(4) Difficulty in Production of Fine Display Unit

In the construction in which the fork-shaped elements 35a, 35b are placed in one and the same plane, finer display portion requires fineness of the respective element and smaller gap between the elements. Therefore the electric short circuit is liable to occur between the elements, making production of the fine display unit difficult.

(5) Limitation to One-Way Writing

In the first constitution disclosed in Japanese Patent Application International Publication No. 8-507154, the retardation of migration of the charged electrophoretic particles by the level difference is limited to the migration from the lower level to the higher level. The migration from the higher level to the lower level is rather accelerated. Accordingly, the driving method is limited to one-way writing, in which entire electrophoretic particles 3 in the picture face are collected to the lower level for resetting entirely, and thereafter one-way writing is conducted. Neither two-way writing nor selective partial rewriting of the picture image can be practiced with this constitution, disadvantageously.

The electrophoretic display unit can be constituted by employing plates 1a, 1b of a flexible material to make the units foldable, but the interval between rear plate 1a and face plate 1b cannot readily be kept precise. In the first constitution, since grid line 36a, cathode element 35a, etc. are formed respectively on different plates 1a, 1b, the interspace is liable to vary, lowering the controllability, disadvantageously. Further, in bonding of plate 1a and plate 1b, since grid line 36a, cathode element 35a, etc. are formed respectively on separate plates 1a, 1b, precise registration is required to counterpose grid line 36a and cathode element 35a to each other, disadvantageously.

On the other hand, in the second constitution, grid line 36b, cathode element 35a, etc. are placed on one and the same plate 1b, so that the above problems are not caused. A display unit of high resolution can be realized by use of a flexible plastic plate as the substrate. Further, the plate bonding operation can be simplified.

In the second constitution, however, even though migration of electrophoretic particles 3 between cathode element 35a and anode element 35b is inhibited, electrophoretic particles 3 migrate to be apart from grid line 36 to cause nonuniform distribution, not distributed uniformly on the surface of cathode element 35a or anode element 35b to cause significant lowering of the display contrast disadvantageously. Further as shown in FIGS. 32A and 32B, the electrophoretic particles having migrated once near to rear plate 1a are not released from rear plate 1a by simply changing the polarity of the voltage applied to grid line 36b, cathode electrode 35a, and the like, making the control impossible.

Accordingly the present invention intends provide an electrophoretic display unit and a driving method thereof without the aforementioned disadvantages.

SUMMARY OF THE INVENTION

For achieving the above objects, the present invention provides an electrophoretic display unit, which has a first substrate and a second substrate conterposed with an interspace, an insulating liquid placed in the interspace, and colored charged electrophoretic particles dispersed in the insulating liquid, and having a stage formed in the interspace along the second substrate, the stage giving a first surface facing a thicker layer portion of the insulating liquid, a second surface facing a thinner layer portion of the insulating liquid on the second substrate, and a side wall surface of the stage connecting the first surface and the second surface, a first display electrode being placed along the first surface, and a second display electrode being placed along the second surface, wherein a third electrode is provided along an intersection line of the side wall surface and an imaginary plane placed at a prescribed distance from the second surface and nearer to the first surface than the second surface.

In the present invention, the third electrode is preferably placed on the aforementioned imaginary plane, and at least a part of the third electrode is overlaid with the second electrode viewed perpendicularly from the second substrate.

In the present invention, the entire third electrode is overlaid with the second electrode, or the third electrode has a portion not overlaid with the second electrode, the portion occupying a boundary area between the area of the first electrode and the area of the second electrode viewed perpendicularly from the second substrate.

The electrophoretic display units of the present invention comprise a control means for controlling the voltage applied to the third electrode, and the state of the display is switched, during the time in which the voltages are applied to the first electrode and the second electrode to be capable of causing migration of the electrophoretic particles, by controlling the potential of the third electrode to be intermediate between the potential of the first electrode and the potential of the second electrode to allow the charged electrophoretic particles to migrate, and controlling the potential of the third electrode to be higher or lower than the potentials of both the first electrode and the second electrode depending on the polarity of the charged electrophoretic particles to inhibit the migration of the charged electrophoretic particles.

The present invention provides also a driving method for driving the electrophoretic display unit wherein a process for switching the display state comprises a first step of impelling the charged electrophoretic particles from one of the first electrode and the second electrode toward the third electrode, and a second step of impelling the charged electrophoretic particles having migrated to the vicinity of the third electrode in the first step to the opposite one of the first electrode and the second electrode.

In the aforementioned switching process, the potential of the third electrode in the first step is set to be intermediate between the potential of the first electrode and the potential of the second electrode, and the potential of the third electrode in the second step is set to be higher or lower than the potential of the third electrode in the first step, depending on the polarity of the charged electrophoretic particles.

The present invention provides a driving method for driving the electrophoretic display unit having a second control electrode on the second substrate, wherein a process for switching the display state comprises a first step of impelling the charged electrophoretic particles from one of the first electrode and the second electrode toward the third electrode, and a second step of impelling the charged electrophoretic particles having migrated to the vicinity of the third electrode in the first step to the opposite one of the first electrode and the second electrode; wherein the potential of the third electrode in the first step is set to be intermediate between the potential of the first electrode and the potential of the second electrode, the potential of the third electrode in the second step is set to be higher or lower than the potential of the third electrode in the first step, depending on the polarity of the charged electrophoretic particles, and the potential of the fourth electrode is set to be intermediate between the potential of the first electrode and the potential of the second electrode.

BRIEF DESCRIPTION OF THE DRAWINGS

FIGS. 14A, 14B, 14C and 14D are timing charts showing change of the applied voltage and reflectivity in a pixel in a process of retention of a white-color state and subsequent reversal to a black-color state.

FIGS. 17A, 17B, 17C and 17D are timing charts showing change of the applied voltage and reflectivity in a pixel in a process of retention of a white-color state and subsequent reversal to a black-color state.

FIGS. 28A and 28B illustrate a structure of another conventional electrophoretic display unit.

FIGS. 34A and 34B illustrate a structure of an electrophoretic display unit of another embodiment of the present invention.

DESCRIPTION OF THE PREFERRED EMBODIMENTS

The modes for carrying out the present invention are described below.

Figure 1A:
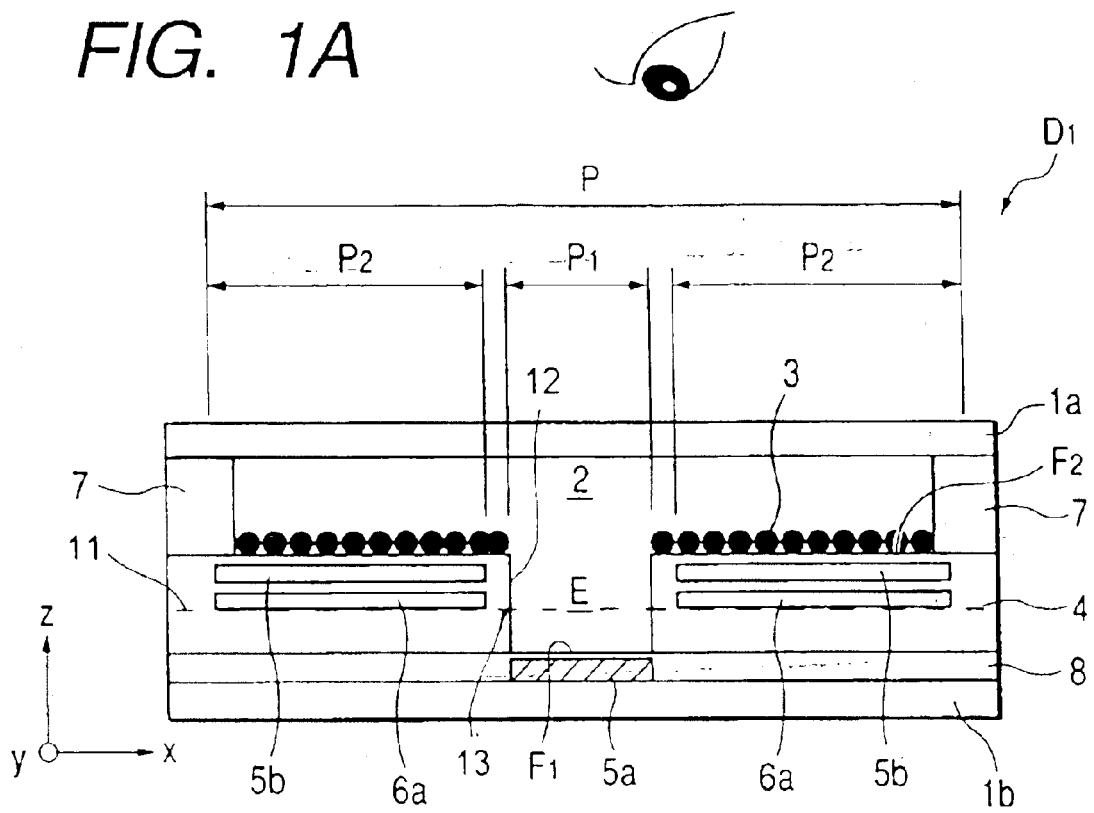
FIGS. 1A and 1B illustrate an example of the structure of the electrophoretic display unit of the present invention.
Figure 1B:
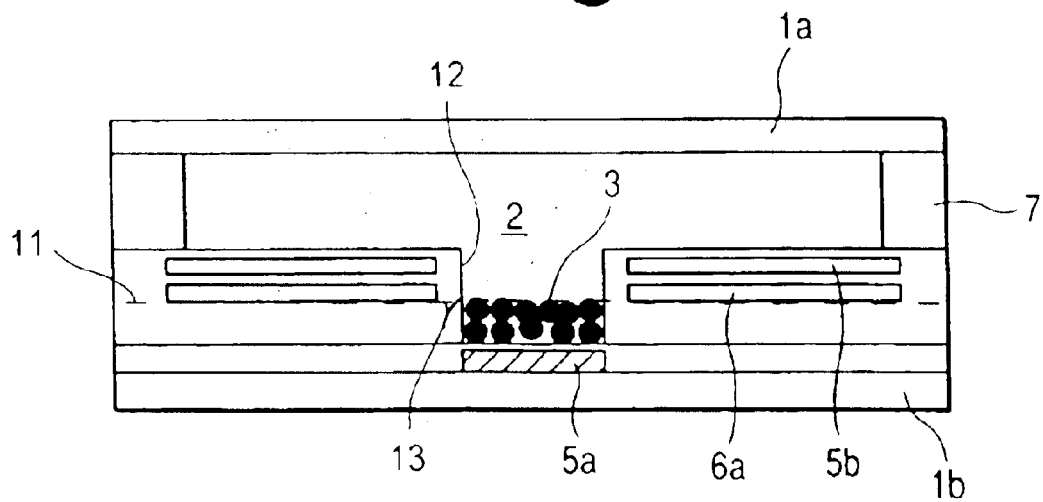

As shown by D1 of FIG. 1A and FIG. 1B, the electrophoretic display unit of the present invention has first and second substrates 1a and 1b counterposed with a prescribed interspace, insulating liquid 2 placed in the interspace between substrates 1a and 1b, and colored electrophoretic particles 3 dispersed in insulating liquid 2. In the interspace between substrates 1a and 1b, stage 4 is provided. Thereby, a first face confronting the thicker liquid layer portion of insulating liquid 2, namely lower level surface F1, and a second face confronting a thinner liquid layer portion of insulating liquid 2, namely higher level surface F2, are formed in each pixel P.

First display electrode 5a is placed along lower level surface F1, and a second display electrode 5b is placed along upper level surface F2. First electrode 5a and second electrode 5b attract or repel the electrophoretic particles by a coulomb force to take a first display state in which the electrophoretic particles accumulate in the lower level as shown in FIG. 1B, or a second display state in which the electrophoretic particles are developed on the upper level as shown in FIG. 1A. The first display state and the second display state can be switched reversibly. In the description below, the first electrode is called a first display electrode, and the second electrode is called a second display electrode.

The unit of the present invention has additionally a third electrode 6a as shown in FIGS. 1A and 1B. The third electrode corresponds to the control electrode described in the aforementioned Japanese Patent Gazette No. 02,740,048, namely control electrode 36a in FIG. 29A, or control electrode 36B in FIG. 29B. As explained below, in switching the display state by applying a voltage between the first and second electrodes, the third electrode as an electrode means causes migration of the electrophoretic particles between the first electrode and the second electrode by application of a certain voltage, or inhibits the migration by application of another voltage. Hereinafter the third electrode is called a first control electrode. The first control electrode 6a is placed directly under second electrode 5b parallel to the upper stage level surface F2 as shown in FIG. 1A. The end portion thereof confronting the side face of hollow portion, or hollow, E is formed in the same shape as the second display electrode along the side face of the hollow portion.

In other words, the first control electrode is placed in an imaginary plane 11 which is placed at a certain distance from the second surface $F_2$ and nearer to the first surface $F_1$ than the second surface $F_2$. The distance between the first control electrode 6a and the first surface $F_1$ is smaller than the distance between the second surface $F_2$ and the first surface $F_1$. In production according to the process described later, the first control electrode 6a is formed with interposition of an insulating layer, so that the distances between the first control electrode 6a and the second display electrode 5b, and the second surface $F_2$ thereon are made as prescribed by controlling the thickness of the interposed insulating layer.

Since the end portion of first control electrode 6a is patterned along the shape of the hollow E, the end portion confronts a hollow side face 12 along an intersecting line 13 of the imaginary plane 11 of the first control electrode 6a and the side face 12 of the stage 4. With this constitution, the voltage of the first control electrode affects strongly the electric field in the hollow. Therefore, the electric field in the hollow can readily be controlled by the first control electrode.

Further, with the aforementioned placement of the first control electrode, the periphery of the first control electrode is at a constant height (i.e., along a contour line) from the lower level surface F1. Therefore the distances between the first control electrodes and the first and second display electrodes are constant throughout the hollow side face. Thereby, the electric field is generated uniformly in the hollow by the control electrode, enabling uniform control of the electrophoretic particles.

Moreover, the first control electrode, which is overlaid with the second display electrode, is not visually recognizable from the direction perpendicular to the substrate. Thereby, the occupation area of the control electrode does not decrease the displaying area, differently from the one shown in FIG. 29B.

In FIGS. 1A and 1B, the electrode ends are covered by a part of stage 4 which is insulating. However, the above advantages can be achieved even when the ends are exposed from the side wall 12 of the stage.

Figure 2:
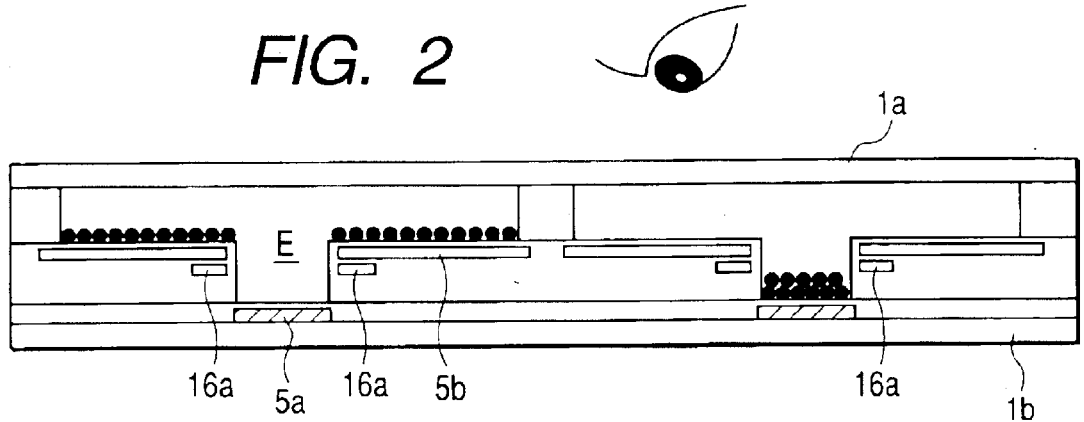
FIG. 2 illustrates another example of the structure of the electrophoretic display unit of the present invention.

The breadth or shape of first control electrode 6a is not specially limited provided that it is capable of forming an electric gate barrier (described later in detail) to retard the migration of electrophoretic particles 3. Although, in FIGS. 1A and 1B, first control electrode 6a is formed approximately in the same size as second display electrode 5b, the first control electrode may be formed only in the vicinity of hollow E as shown by symbol 16a in FIG. 2.

Figure 3:
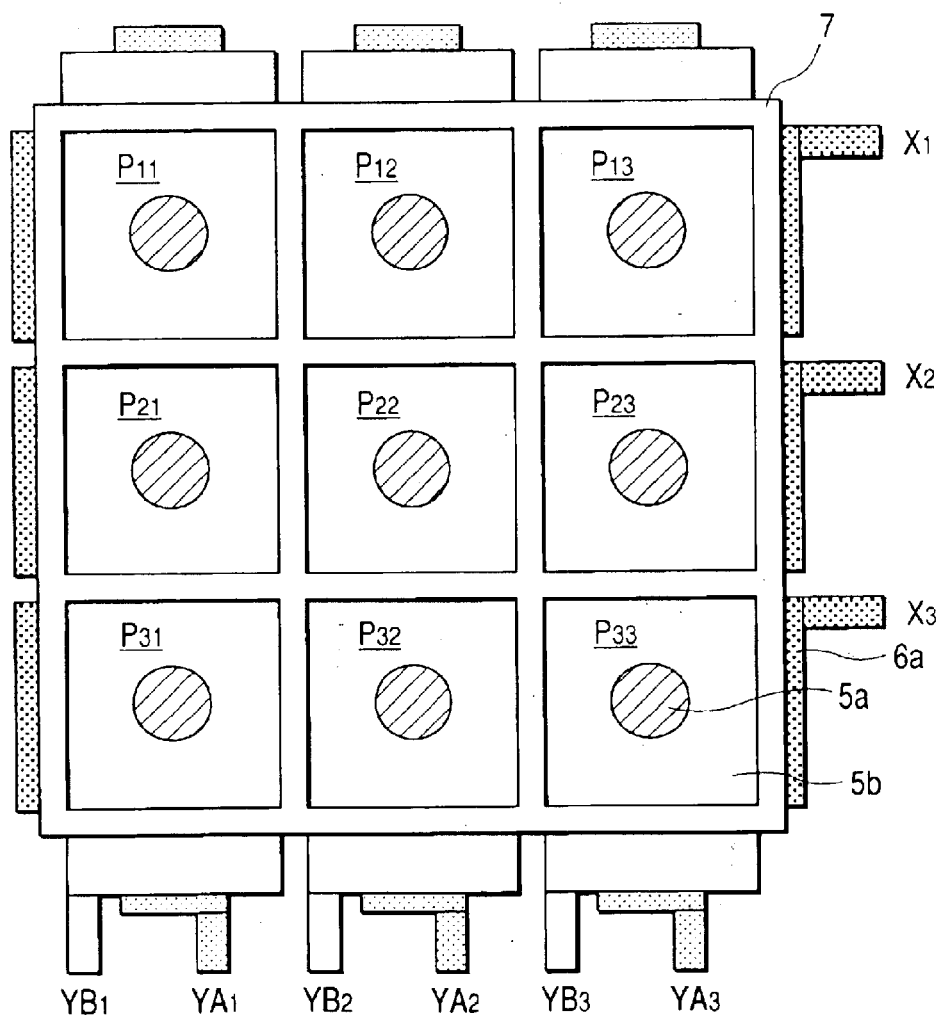
FIG. 3 illustrates an example of wiring in the electrophoretic of the present invention with one type of hollow portions.

In the electrophoretic display unit D1 shown in FIGS. 1A and 1B, lower level surface F1 (namely, hollow E) is provided singly in a circle shape at nearly the center of pixel P (see FIG. 3). However, the placement, number and shape of the lower level surface F1 are not limited thereto. Examples thereof include
placement at a decentered position in the pixel, noncircular shape (for example, square shown by symbol E1 in FIG. 4, or stripe shape shown by symbol E2 in FIG. 5), or two or more in one pixel (for example, two as shown by symbol E3 in FIGS. 6A and 6B, or four in one pixel as shown by symbol E4 in FIG. 7).

Figure 8:
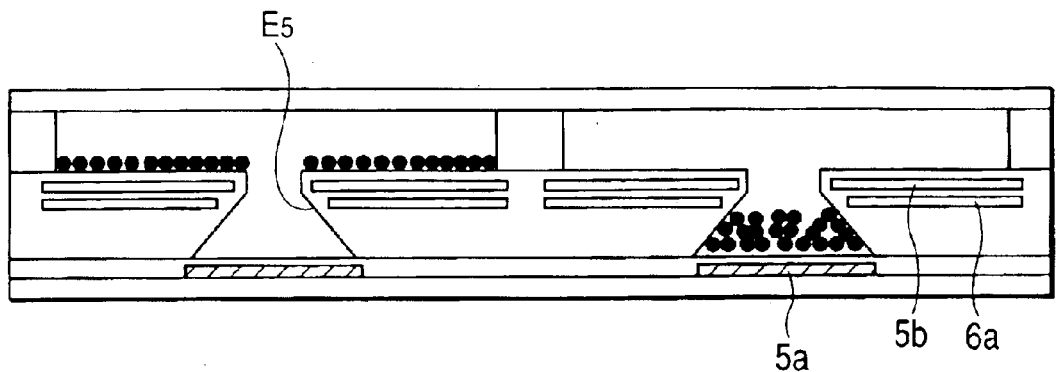
FIG. 8 illustrates still another type of hollow portions.
Figure 9:
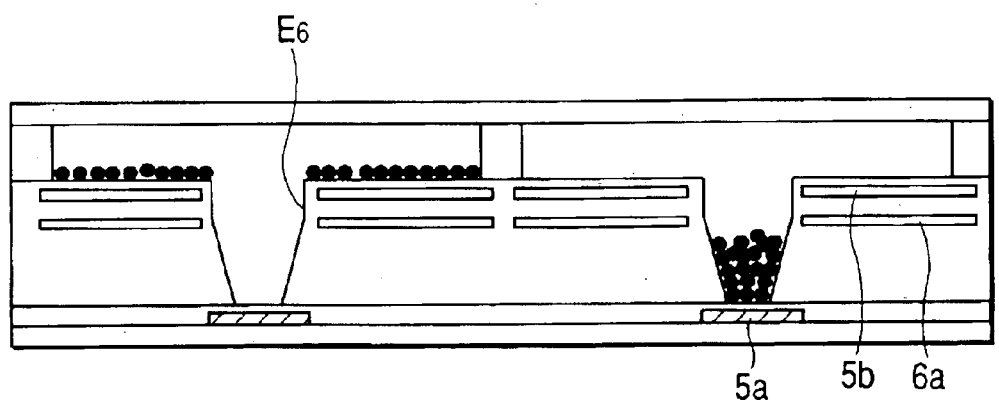
FIG. 9 illustrates still another type of hollow portions.
Figure 10:
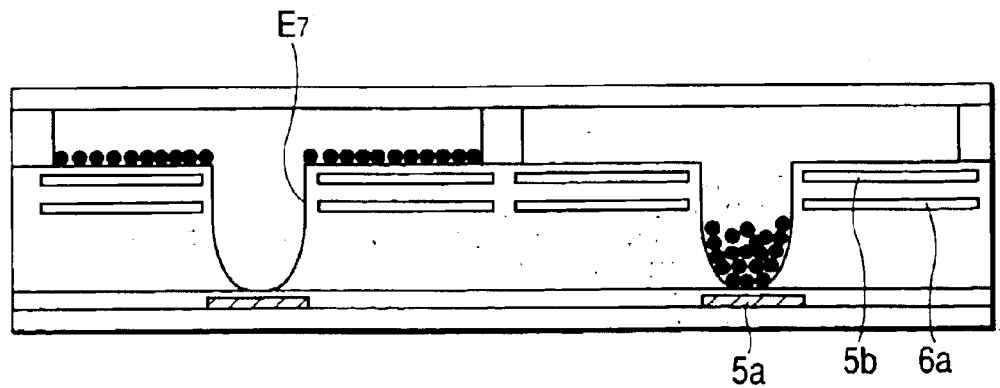
FIG. 10 illustrates still another type of hollow portions.

Hollow E is columnar in shape in FIG. 1 and FIG. 3. However, the shape is not limited thereto, provided that electrophoretic particles 3 can migrate between display electrodes 5a and 5b. For example, the hollow may be inversely tapered to have an opening smaller than the bottom as shown by symbol E5 in FIG. 8, or may be tapered to have an opening larger than the bottom as shown by symbol E6 in FIG. 9. Otherwise, the bottom of hollow E7 may be curved slightly as shown in FIG. 10.

Figure 11:
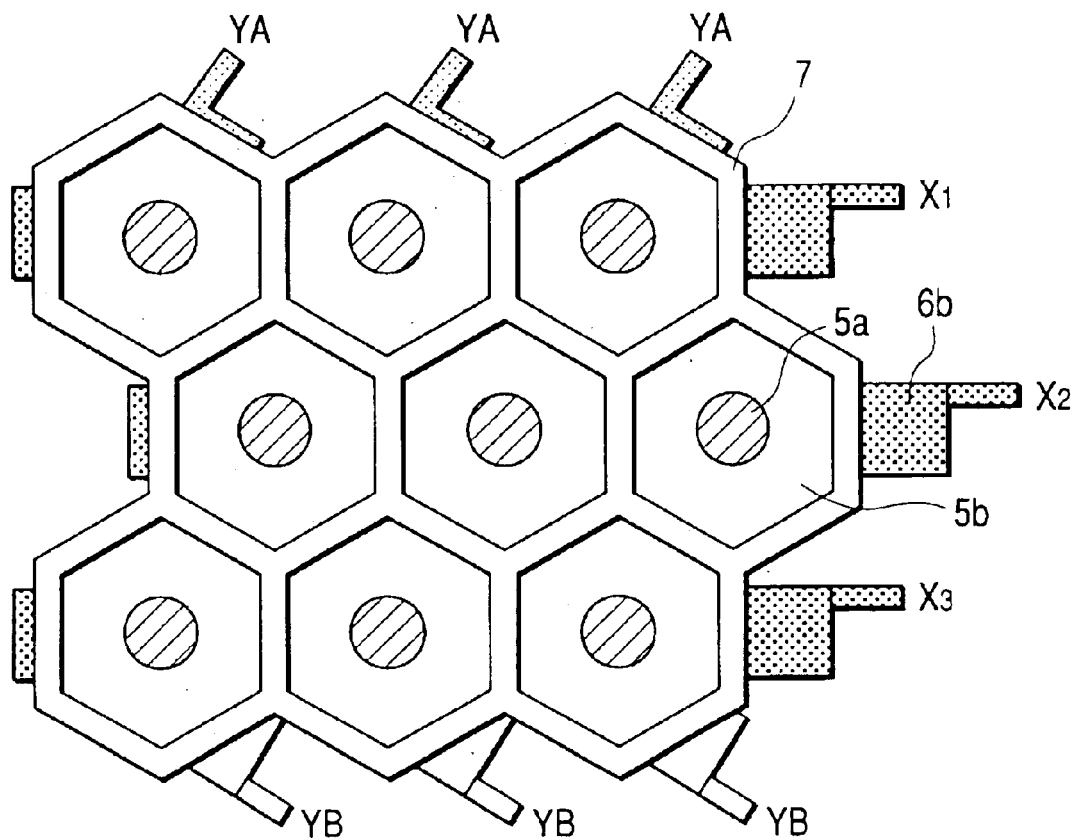
FIG. 11 illustrates still another type of hollow portions.

The pixel is not limited to be tetragonal in shape, but may be of other shape (for example, hexagonal as shown in FIG. 11).

In the electrophoretic display unit shown in FIGS. 1A and 1B, "region P1 occupied by first display electrode 5a" is surrounded by "region P2 occupied by second display electrode 5b". However, the relation may be reversed. That is, "region occupied by first display electrode" may be formed in the peripheral portion of the pixel and "region occupied by second display electrode" may be placed at the central portion of the pixel. Specifically, "region occupied by the first display electrode" may be annular.

Figure 35:
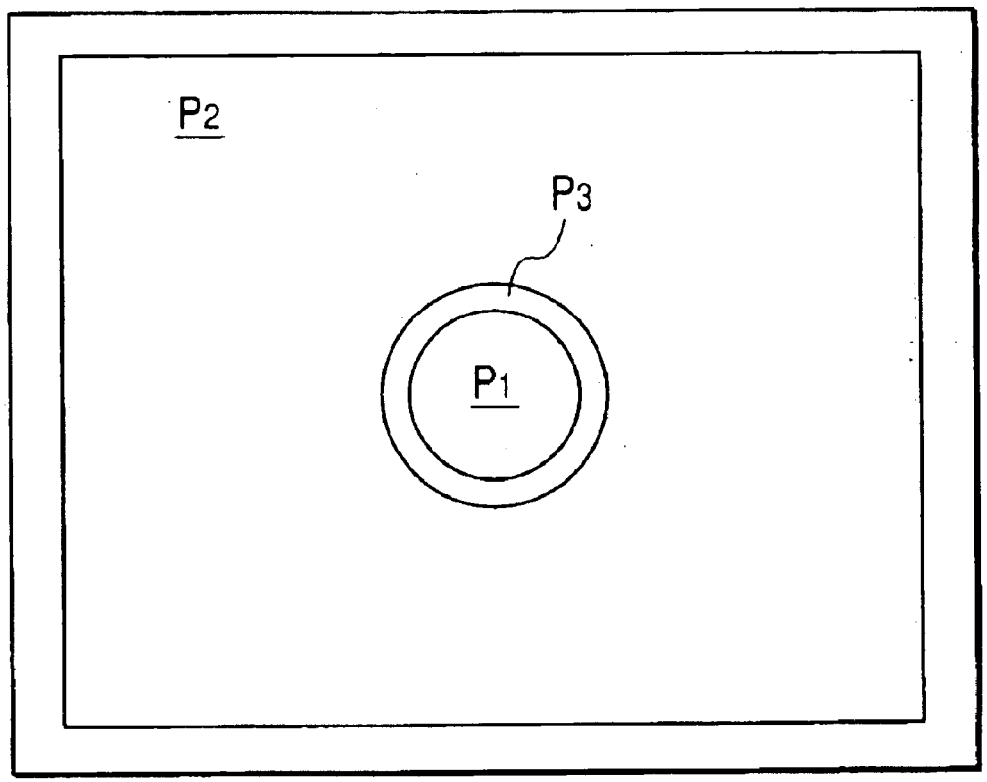
FIG. 35 illustrates shapes and arrangement of electrodes of the electrophoretic display unit shown in FIGS. 34A and 34B.

FIGS. 34A and 34B are respectively a cross-sectional view and a plan view of another embodiment of the electrophoretic display unit of the present invention. FIG. 35 illustrates the electrodes only of the unit of FIG. 34B by removing the electrophoretic particles from FIG. 34B. In these drawings, the same symbols as in FIGS. 1A and 1B are used for indicating corresponding members. In this unit, first control electrode 6a is placed nearer to first display electrode 5a than second display electrode 5b is placed. When this electrophoretic display unit is viewed from the z direction, the pixel has, on the xy plane, a region occupied by first display electrode 5a (P1 in FIG. 34A and FIG. 35) and a region occupied by second display electrode 5b (P2 in FIG. 34A and FIG. 35). Differently from the embodiment of FIGS. 1A and 1B, the edge of first control electrode 6a protrudes in a direction nearly parallel to substrates 1a and 1b (in the xy plane) in relation to the edge of second display electrode 5b to give "region P3 occupied by first control electrode 6a" in the boundary area between the regions P1 and P2. Thereby in the displaying area, second display electrode 5b does not completely cover first control electrode 6a.

Such arrangement of the second display electrode set back with a certain breadth from the periphery of the hollow is effective to avoid concentration of the distribution of electric field of the second display state at the edge portion and to uniformize the distribution of the electrophoretic particles over the second display electrode in the second display state.

Figure 36A:
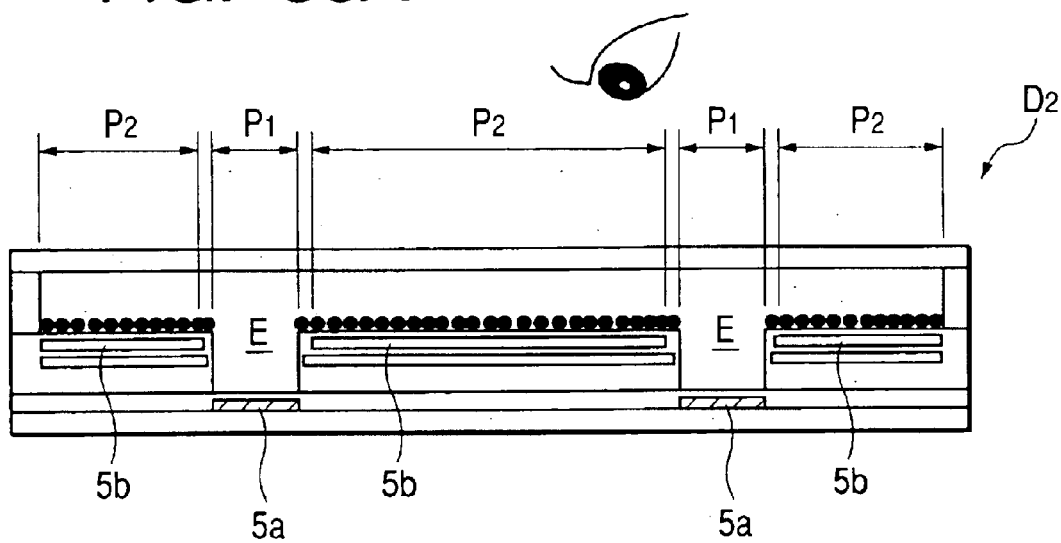
FIGS. 36A and 36B illustrates another example of the structure of an electrophoretic display unit shown in FIGS. 34A and 34B.
Figure 36B:
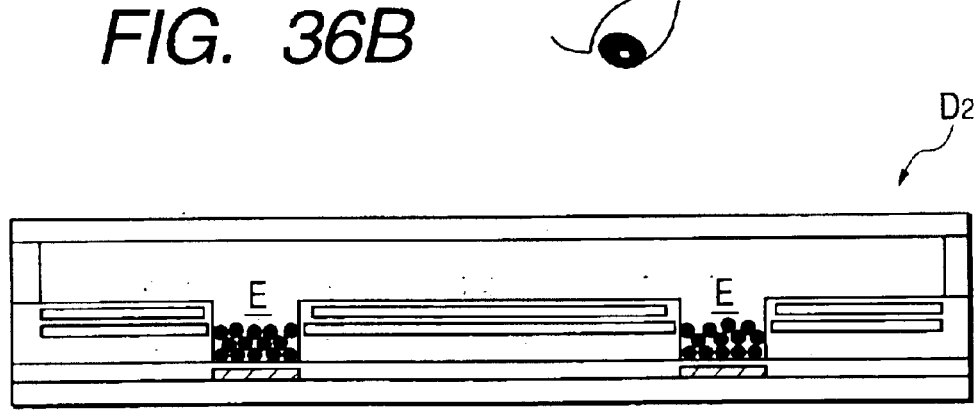

The variations explained by reference to FIGS. 1A and 1B are also possible in the embodiments shown in FIGS. 34A and 34B. Specifically, in the electrophoretic display unit D1 shown in FIGS. 34A and 34B, lower level surface F1 (namely hollow E) is provided singly in a circle shape at nearly the center of pixel P. However, the placement, number, and shape of the lower level surface F1 are not limited thereto. Examples thereof include placement at a decentered position in the pixel, noncircular shape, or two or more in one pixel as shown in FIGS. 36A and 36B. Incidentally, in the electrophoretic display unit shown in FIGS. 34A and 34B, and FIGS. 36A and 36B, "region P1 occupied by first display electrode 5a" is surrounded by "region P2 occupied by second display electrode 5b". However, the relation may be reversed. That is, "the region occupied by the first display electrode" may be formed in the peripheral portion of the pixel and "the region occupied by the second display electrode" may be placed at the central portion of the pixel. Specifically, "the region occupied by the first display electrode" may be annular in shape.

In the embodiments of FIGS. 1A and 1B and FIGS. 34A and 34B, for the pixel size of 125 $\mu$m×125 $\mu$m, the particle size ranges preferably from 0.5 to 10 $\mu$m, the interspace between first substrate 1a and second substrate 1b ranges preferably from 10 to 100 $\mu$m, and the level difference caused by the stage 4 ranges preferably from 5 to 70 $\mu$m. Generally, the level difference caused by stage 4 is preferably not less than two times but not more than 140 times the size of electrophoretic particles 3. As described before, with a smaller level difference, a larger area is necessary for the lower level surface for accumulating the electrophoretic particles in hollow E for the first display state, decreasing the area of the second display electrode to lower the display contrast. On the other hand, with a larger level difference, the electrophoretic particles may remain in the hollow not to cover completely the second electrode in the second display state.

Figure 12:
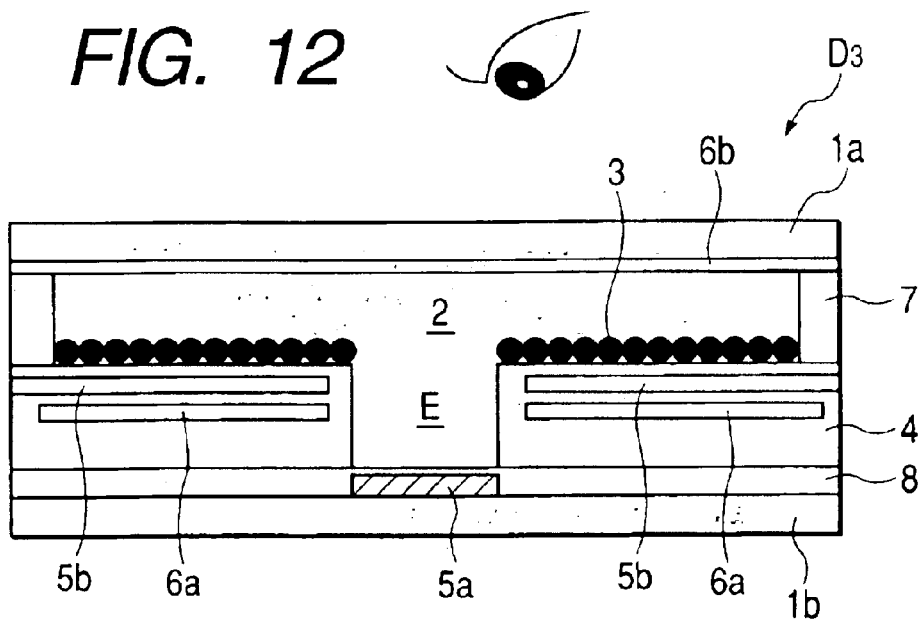
FIG. 12 illustrates still another example of the structure of the electrophoretic display unit of the present invention.

In another embodiment, as shown in FIG. 12, second control electrode 6b may be placed on the side of first substrate 1a. This electrode 6b may be formed over the entire face of first substrate 6a, and is preferably transparent. Second control electrode 6b, by application of a suitable voltage thereto, enables smooth migration of electrophoretic particles 3 from first display electrode 5a to second display electrode 5b even when the height of stage 4 (level difference) is as large as several ten times the electrophoretic particle size, and prevents remaining of the electrophoretic particles 3 in the hollow and prevents the drop of the contrast caused by the remaining of the particles.

Figure 42A:
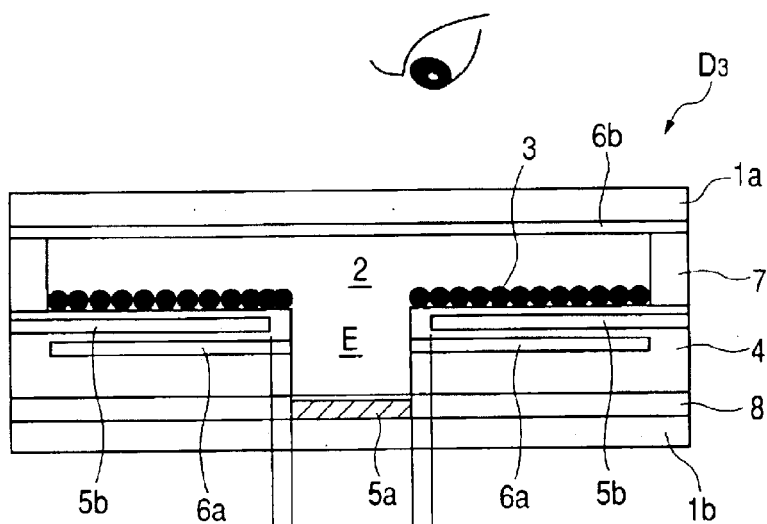
FIGS. 42A and 42B illustrate another example of the structure of the electrophoretic display unit of the present invention.
Figure 42B:
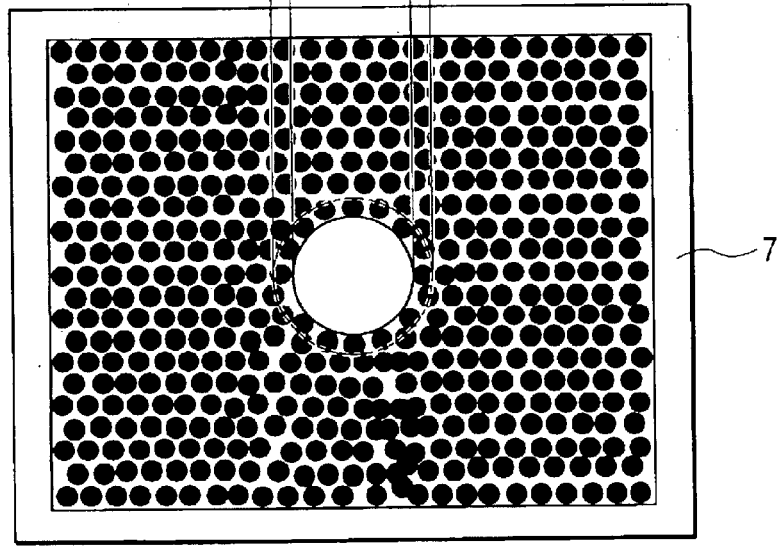

Naturally, the second electrode is effective even with the first control electrode is overlaid partially with the second display face as shown in FIGS. 42A and 42B.

In the embodiments of the present invention shown in FIGS. 1A and 1B, FIGS. 34A and 34B, FIG. 12, and FIGS. 42A and 42B, lead wirings (arranged to be insulated by displacement from each other in the z direction in FIG. 1A) are connected to electrodes 5a and 5b, and 6a (also 6b if provided), and the lead wirings are connected to a voltage application means not shown in the drawings equipped in the periphery or outside of the display unit to apply the voltage.

Figure 4:
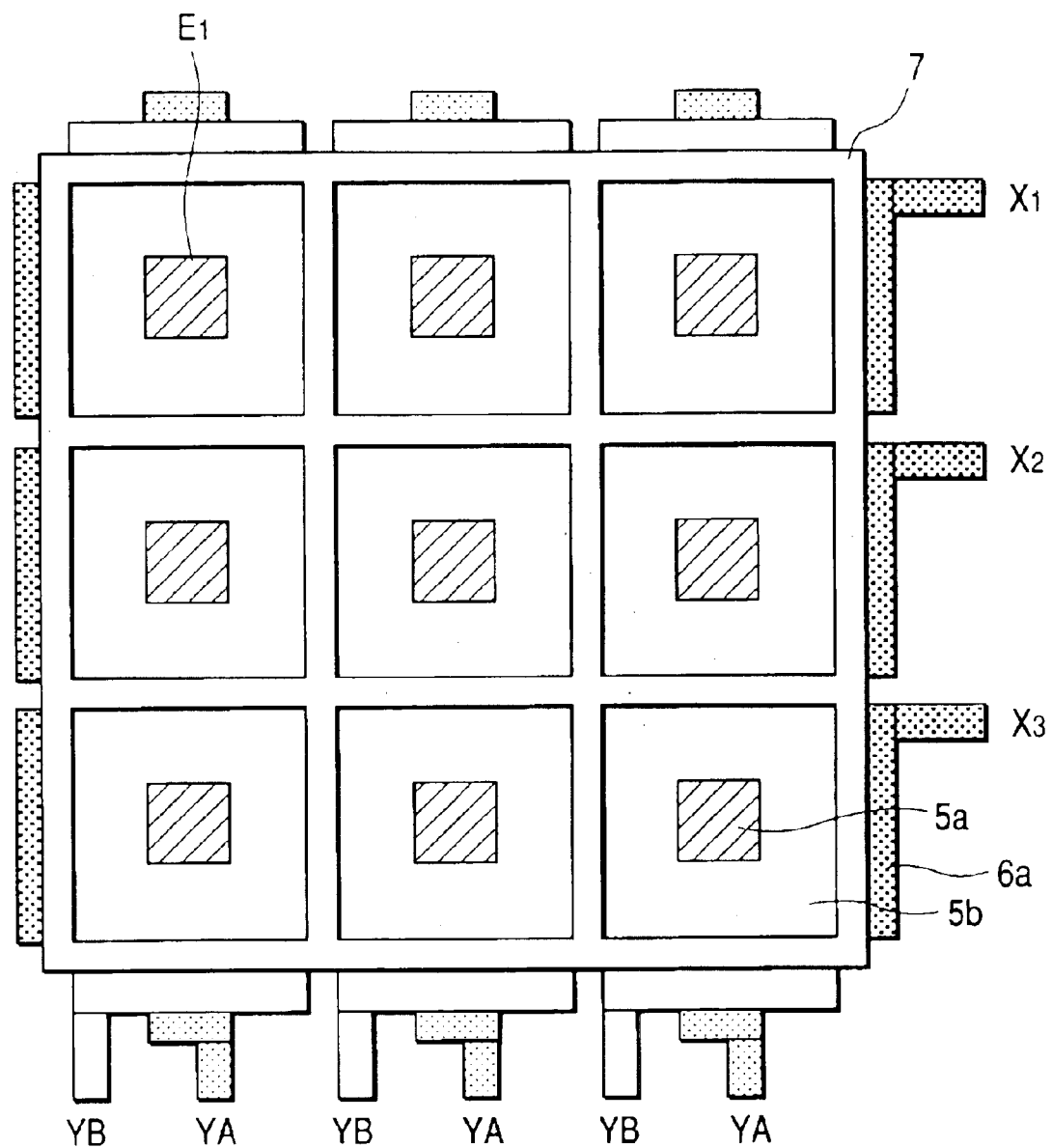
FIG. 4 illustrates another type of hollow portions.

FIG. 3 and FIG. 4 are respectively a plan view showing a pixel arrangement of a display unit of the present invention having the sectional structure shown in FIGS. 1A and 1B. Scanning electrode lines X1, X2, X3, . . . are arranged in the x direction in the drawing. Scanning electrode lines X1, X2, X3, . . . are arranged in the x direction in the drawing, and are respectively connected electrically to first control electrodes 6a of pixels arranged in the x direction (e.g., pixels P11, P12, P13, . . . ). First signal electrode lines YA1, YA2, YA3, . . . and second signal electrode lines YB1, YB2, YB3, . . . are arranged in the y direction in the drawing. First signal electrode lines YA1, YA2, YA3, . . . are respectively connected electrically to first display electrodes of the pixels arranged in the y direction (e.g., pixels P11, P21, P31, . . . ). Second signal electrode lines YB1, YB2, YB3, . . . are respectively connected electrically to second display electrodes 5b of the pixels arranged in the y direction (e.g., pixels P11, P21, P31, . . . ). These drawings show only 3×3 pixels, but the arrangement is not limited thereto.

Figure 5:
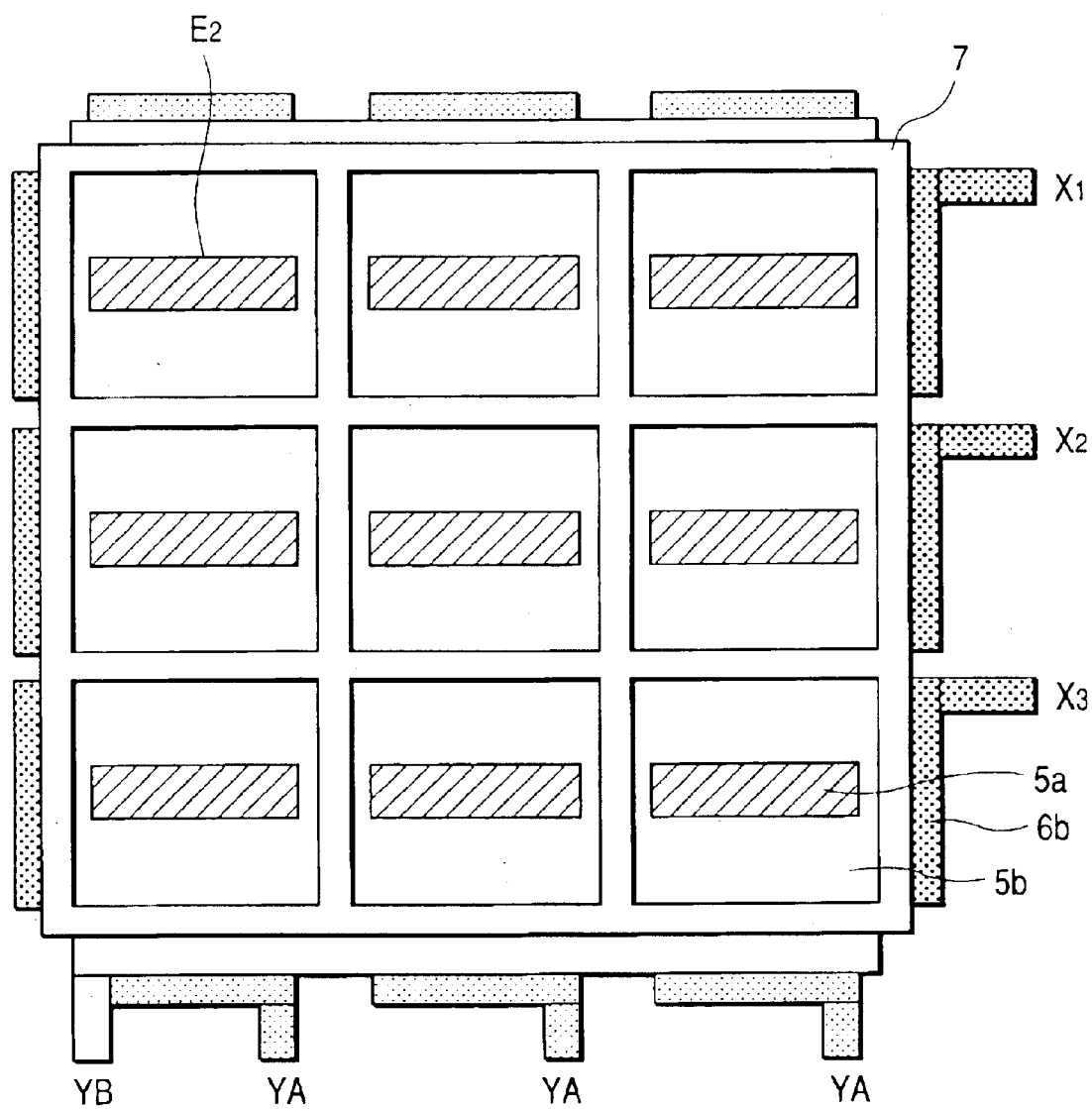
FIG. 5 illustrates still another type of hollow portions.
Figure 6A:
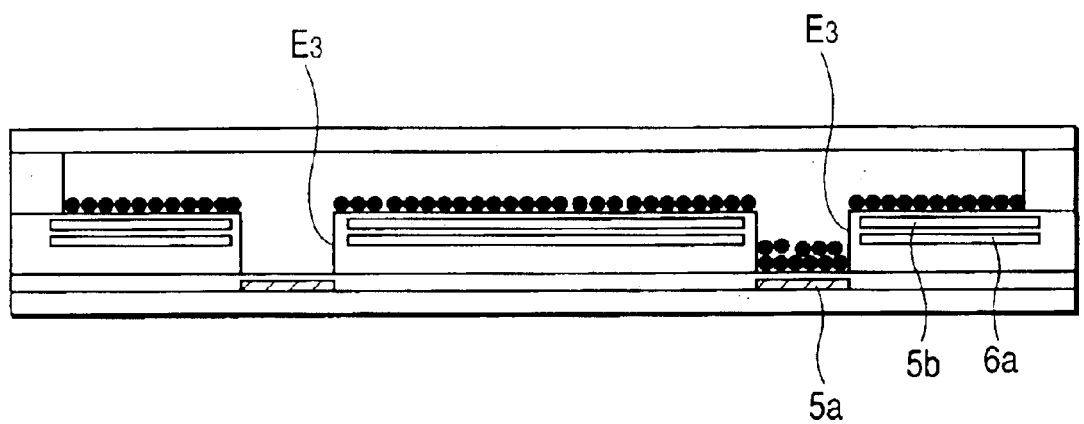
FIGS. 6A and 6B illustrate still another type of hollow portions.
Figure 6B:
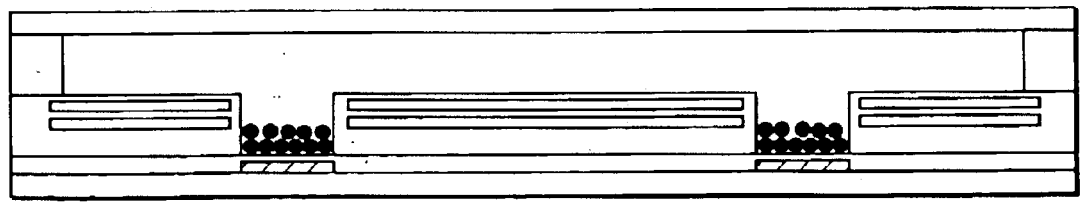
Figure 7:
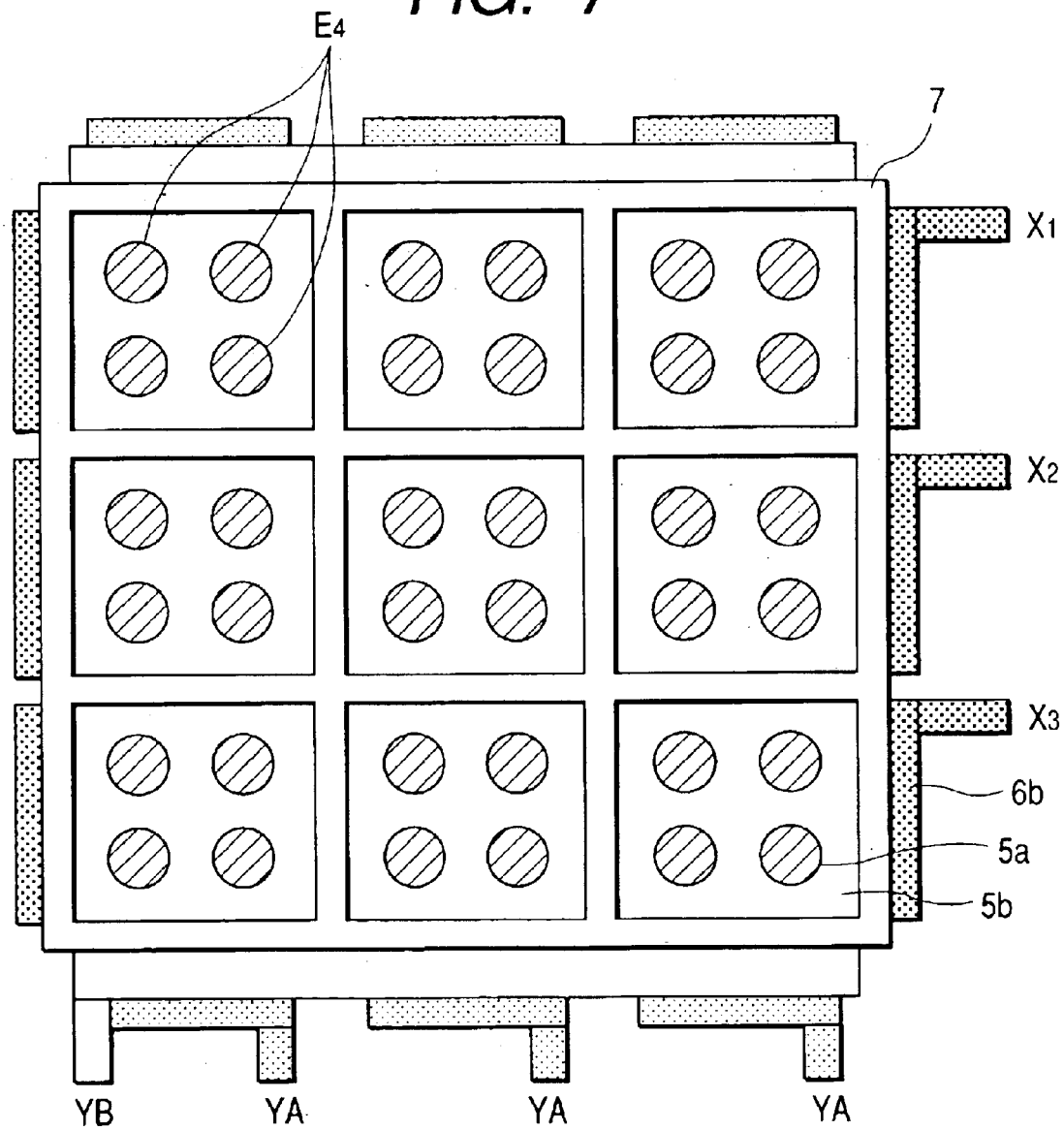
FIG. 7 illustrates still another type of hollow portions.

FIG. 5 and FIG. 7 are respectively a plan view of another electrophoretic display unit of the present invention. Differently from the units of FIGS. 3 and 4, second display electrode face 5b is formed integrally to cover entire display regions except hollow E2 making the level difference. Thereby, the lead wirings are completely shielded by the second display electrode face 5b to prevent leakage of the electric field from the wiring for driving of the electrophoretic particles. Conventional electrophoretic display units of a voltage-displaying system have a serious problem that leakage field from the wiring impairs the display quality. However, the shielding of the second display electrode prevents unnecessary driving (i.e., display deterioration) of electrophoretic particles owing to the leakage field from the lead wirings of first display electrodes or the first control electrodes. Thus according to the present invention, the shielding of the leakage field from the wiring by the display electrodes renders unnecessary the provision of additional shield electrode or like parts, whereby the construction is made compact and the production process is simplified.

Figure 30:
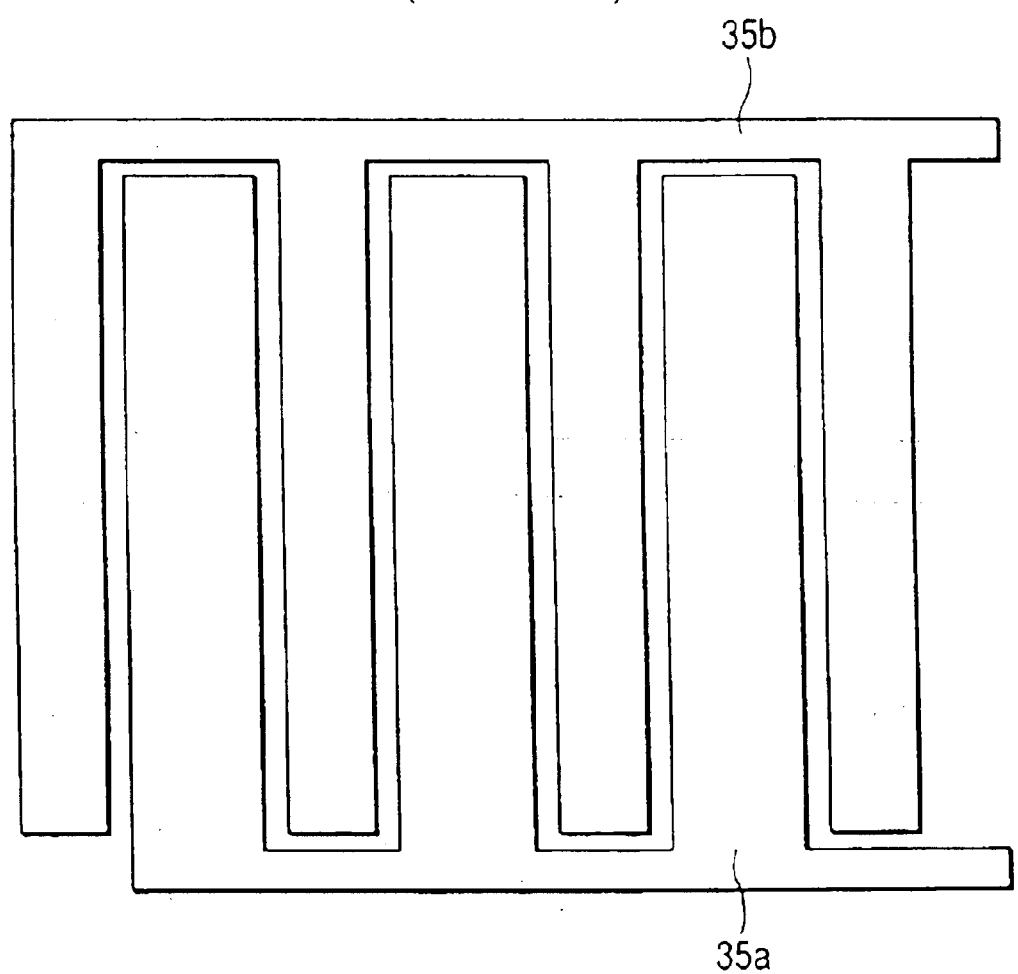
FIG. 30 illustrates shapes and arrangement of a cathode element and an anode element.
Figure 31A:
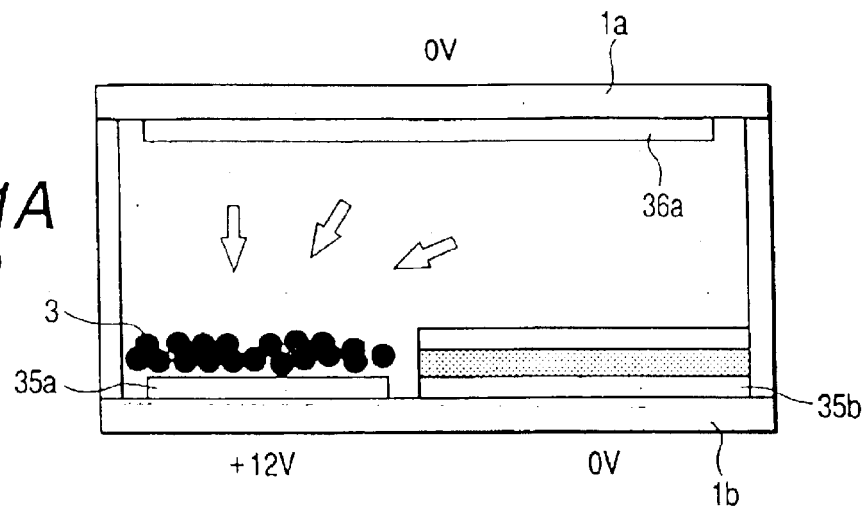
FIGS. 31A, 31B and 31C illustrate working operation of a conventional electrophoretic display unit.
Figure 31B:
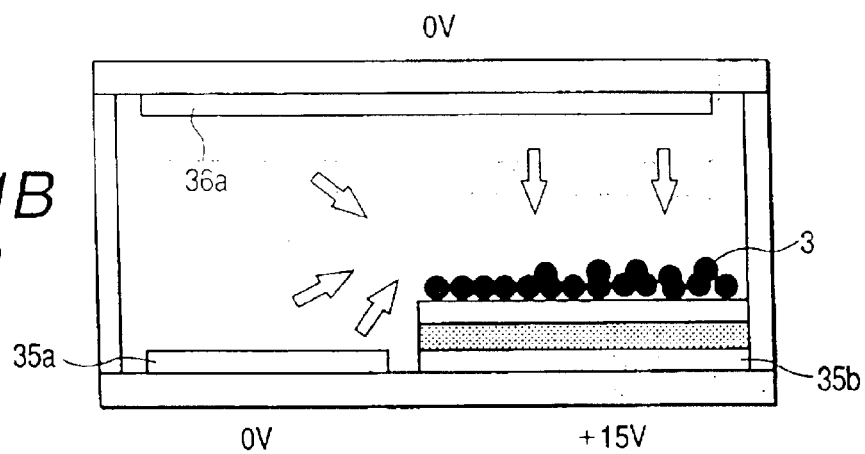
Figure 31C:
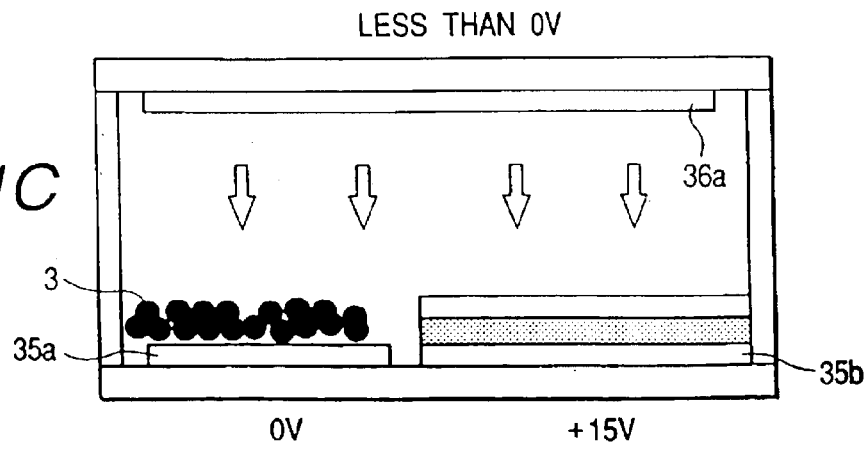

The shielding effect results from the stepped electrode arrangement which is the remarkable feature in construction of the present invention. This effect cannot be achieved by conventional constitution such as the one disclosed in Japanese Patent Publication No. 02740048 in which display electrodes are arranged to fit together (FIG. 30). (Constitutional elements other than electrodes)

The constitutional elements other than the electrode in the embodiments of the present invention are explained below.

The electrophoretic display unit of the present invention is of a horizontal migration type, in which electrophoretic particles 3 driven to cover first display electrode 5a or second display electrode 5b are visually recognizable through insulating liquid 2. Therefore, insulating liquid 2 should be transparent to enable visual recognition of charged electrophoretic particles 3. One of display electrodes 5a and 5b may be colored in the same color as the colored charged electrophoretic particles, and the other display electrode 5b or 5a may be colored in another color. For example, colored charged electrophoretic particles 3 are colored black, first display electrode 5a is colored black, and second display electrode 5b is colored white. However the color combination is not limited thereto, and can be selected without limitation. For color displaying, colored charged electrophoretic particles 3 may be colored black, one display electrode 5a or 5b may be colored black, and the other display electrode 5b or 5a may be colored suitably red, green, or blue. The method for coloring the electrode includes:

coloring of electrode itself;
formation of a colored layer in addition to the electrode; and
utilization of an insulating layer formed to cover the electrode (e.g., utilization of color of the insulating layer itself, or incorporation of a colorant into the insulating layer).

In the case where the one electrode is colored black and the other electrode is colored white, the area ratio is preferably about 3:7 or less. For example, when first electrode 5a is colored black and the second electrode 5b is colored white, the area P1 occupied by first display electrode 5a ranges preferably from 10 to 30% of the pixel area and the area P2 occupied by second display electrode 5b ranges preferably 90 to 70% of the pixel area.

Partition wall 7 surrounding the respective pixels prevents migration of charged electrophoretic particles 3 between the pixels. The material for the partition wall is selected preferably from polymer resins. The partition wall may be formed by any process, the process including application of a photosensitive resin layer, and subsequent light exposure and wet development; adhesion of a separately prepared barrier wall; and formation by printing.

An insulating layer may be formed so as to cover electrodes 5a, 5b, . . . . The formed insulating layer will inhibit charge injection from electrodes 5a, 5b, . . . to charged electrophoretic particles 3. The material for the insulating layer is selected from those not liable to form a pin hole even in a thin film state, and having a low dielectric constant, specifically including amorphous fluoro-resins, high-transparency polyimide resins, polyethylene terephthalate (PET), and so forth.

The material for substrates 1a and 1b includes polymer films, such as polyethylene terephthalate (PET), and polyether sulfone (PES); and inorganic materials such as glass, and quartz.

The first display electrode 5a may be made from any material which is electroconductive and is capable of being patterned. The second control electrode 6b may be made from any material which is electroconductive and is capable of being patterned, the material including ITO (indium/tin oxide).

The charged electrophoretic particle 3 may be formed from a material which is sufficiently chargeable positively or negatively in the insulating liquid. The material includes resins such as polyethylene, and polystyrene. For black coloring of the particles, carbon or a like material is blended into the resin.

Insulating liquid 2 may be selected from colorless transparent liquids such as silicone oils, toluene, xylene, and high-purity petroleum. (Explanation of production process)

Firstly, first display electrode 5a is formed on second substrate 1b.

Then, stage 4, first control electrode 6a, and second display electrode 5b are formed. The formation may be conducted by vapor deposition, sputtering, photolithography, etching, metal plating, molding, or printing. For example, a film of a stage-forming material is formed on the entire face of the substrate. First control electrode 6a is formed on the surface thereof (film formation and patterning). Further thereon, another film of the stage-forming material is formed. Thereon, the second display electrode film, and a resist film are successively formed over the entire face, and the outermost resist film is patterned. Finally, by employing the outermost resist pattern as the mask layer, the second display electrode film and the stage forming material are successively dry-etched or wet-etched to form stage 4.

Thereafter, substrates 1a and 1b are bonded together, and insulating liquid 2 and charged electrophoretic particles 3 are introduced therein.

(Driving Method)

FIGS. 13A to 13F show first driving principle of the electrophoretic display unit of the present invention. In the explanation below, the charged electrophoretic particles are charged positively. With the negatively charged electrophoretic particles, the same driving can be conducted by reversing the voltages, naturally.

Figure 13A:
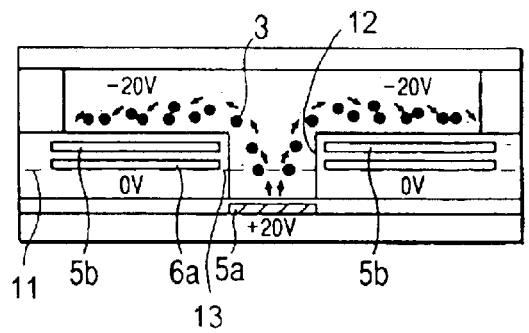
FIGS. 13A, 13B, 13C, 13D, 13E and 13F illustrate schematically migration of electrophoretic particles 3 and a state of electric field vectors in two-way writing.

FIG. 13A shows that with first control electrode 6a kept at a control voltage Vc=0V as a write-permitting voltage, application of a voltage Vd1=+20V to first display electrode 5a and a voltage Vd2=−20V to second display electrode 5b impels the positively charged electrophoretic particles 3 to migrate toward second display electrode 5b.

Figure 13B:
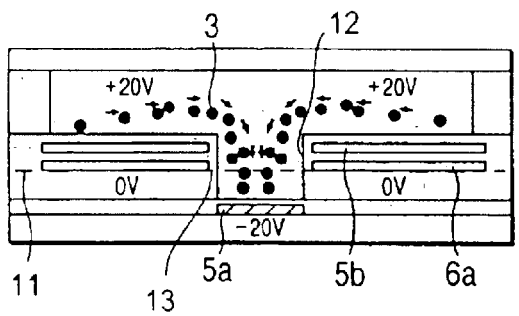

FIG. 13B shows that with first control electrode 6a kept at a control voltage Vc=0V applied as a writing-permitting voltage, application of a voltage Vd1=−20V to first display electrode 5a and a voltage Vd2=+20V to second display electrode 5b impels the positively charged electrophoretic particles 3 to migrate toward first display electrode 5a.

Figure 13C:
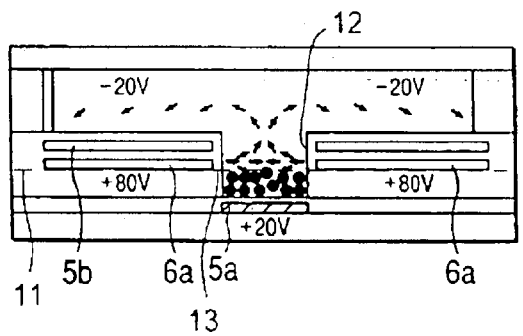
Figure 13D:
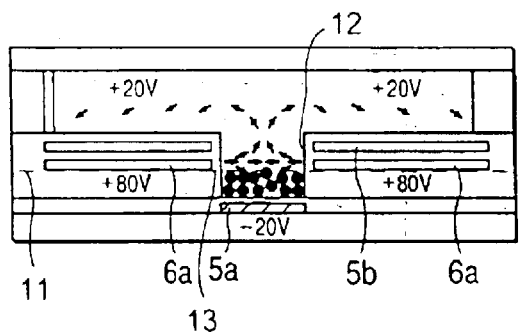
Figure 13E:
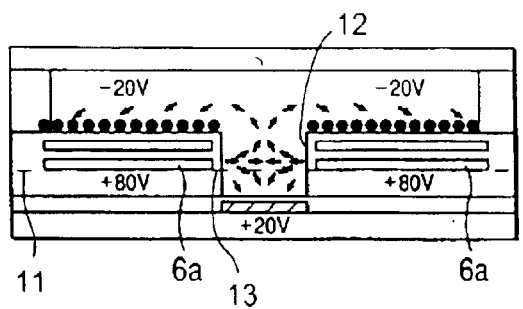
Figure 13F:
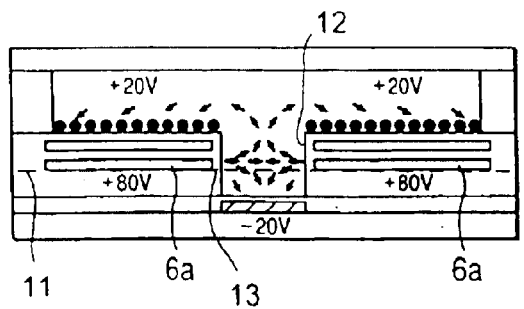

With first display electrode 5a covered with charged electrophoretic particles 3, application of control voltage Vc=+80V to first control electrode 6a as the write-inhibiting voltage (retention voltage) forms electrically a high potential region, namely an electrical gate barrier, around the imaginary plane 11 extending from first control electrode (6a in FIGS. 13A to 13F) in the hollow, which inhibits the migration of electrophoretic particles 3 to second display electrode 5b even with application of the voltages for migration between first and second display electrodes (+20V and −20V), (FIGS. 13C and 13D). With second display electrode 5b covered with charged electrophoretic particles 3, application of control voltage Vc=+80V to first control electrode 6a as the write-inhibiting voltage (retention voltage) forms similarly an electrical gate barrier to inhibit the migration of electrophoretic particles 3 to first display electrode 5a (FIGS. 13E and 13F).

As described above, in the principle of driving of the present invention, the migration of the electrophoretic particles between the first and second display electrodes is permitted by setting the potential of the first control electrode to be intermediate between the potential of the first display electrode and the potential of the second display electrode, and the migration of the electrophoretic particles between the first and second display electrodes is inhibited by setting the potential of the first control electrode to be higher (lower for negatively charged electrophoretic particles) than the potentials of the both display electrodes.

With second control electrode 6b employed as shown in FIG. 12, the potential of the second control electrode is fixed preferably to be intermediate between the potentials of the first display electrode and the second display electrode.

In the matrix arrangement of electrodes shown in FIGS. 3 and 4, with a voltage of one of the aforementioned control electrodes, e.g., of X1, kept at a potential intermediate between the first and second display electrodes as described above, application of voltage between first electrode 5a and second display electrode 5b in accordance with display information allows electrophoretic particles 3 to be adsorbed to either one of electrodes 5a and 5b depending on the polarity of the applied voltage. Thereby the display states of pixels P11, P12, P13 are determined. By keeping the potentials of other control electrodes X2, X3 to be higher than the potentials of first display electrode 5a and second display electrode 5b, the aforementioned electric barriers are produced to keep the display states of the pixels on these lines. For changing the display states of pixels P21, P22, and P23 of the second line, the potential of X2 is lowered, the potentials of X1 and X3 are raised, and voltages are applied to the first and second display electrodes in accordance with the display information. Thereby, the display states of pixels of the line of X2 can be decided. The display states of pixels P31, P32, and P33 of the third line can be controlled by X3 in the same manner.

In the writing process, various variations are possible. For the wiring system, two variations are possible:

one variation in which first control electrode 6a of each of the pixels is connected to the scanning electrode line, and display electrodes 5a and 5b are connected to signal electrode lines, and another variation in which first control electrode 6a of each of the pixels is connected to the signal electrode line, and display electrodes 5a and 5b are connected to scanning electrode line.

For the writing direction, the writing can be conducted by resetting preliminarily the entire pixels into one state and conducting one-way writing for the pixels requiring the rewriting on the respective scanning lines; or by conducting two-way writing to white or to black to the respective scanning lines.

The method for driving a matrix as explained above using FIGS. 13A to 13F, 3 and 4 exemplifies a two-way writing where the first control electrode is assumed to be a scanning electrode wiring, and the pair of the first and second display electrodes is assumed to be signal electrode wirings.

Figure 15A:
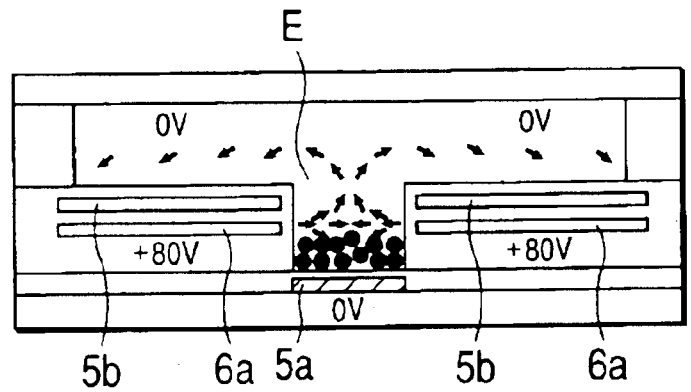
FIGS. 15A, 15B and 15C illustrate schematically migration of electrophoretic particles 3 and a state of electric field vectors in driving in a manner as shown in FIGS. 14A to 14D.
Figure 15B:
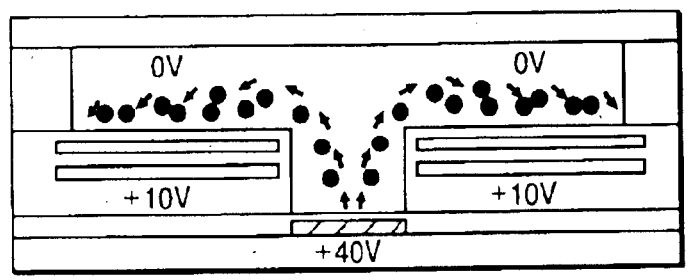
Figure 15C:
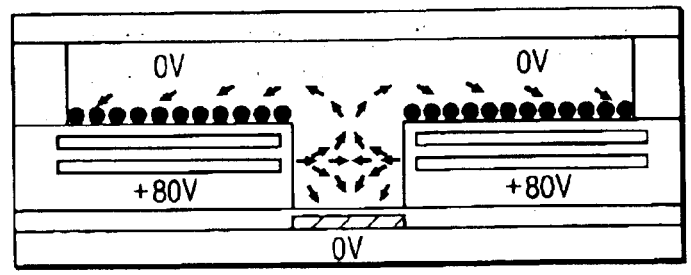

The one-way writing method is explained below by reference to FIGS. 14A to 14D and FIGS. 15A to 15C. FIGS. 14A to 14D are timing charts showing changes of the applied voltages and the reflectivity in reversal from a white state to a black state of a pixel: FIG. 14A showing the change of the driving voltage Vd1 applied to first display electrode 5a; FIG. 14B showing the change of the driving voltage Vd2 applied to second display electrode 5b; FIG. 14C showing the change of the driving voltage Vc applied to first control electrode 6a; and FIG. 14D showing the change in the reflectivity. FIGS. 15A to 15C illustrate schematically the migration of charged electrophoretic particles 3, and the state of the electric field vectors: FIG. 15A illustrating the state during the period of 0 to Ta; FIG. 15B illustrating the state during the period of Ta to Tb; and FIG. 15C illustrating the state after the time Tb. In this explanation, electrophoretic particles 3 are positively charged, first display electrode 5a is black in color, and second display electrode 5b is white in color.

In a state that electrophoretic particles 3 are accumulated in hollow E by adsorption to first display electrode 5a, in the period 0–Ta, as shown in FIG. 15A, voltages are applied as below:

Driving voltage Vd1=0V (FIG. 14A)
Driving voltage Vd2=0V (FIG. 14B)
Control voltage Vc=+80V (FIG. 14C).

The control voltage Vc produces an electric gate barrier between the counterposing portions of the first control electrode 6a. Charged electrophoretic particles 3 are pushed thereby toward the display electrode to be enclosed in hollow E. As the result, second display electrode 5b is visually recognizable from the outside more clearly than charged electrophoretic particles 3, thereby the pixel displaying a white color (white display at reflectivity of about 70%).

Next, in the period Ta-Tb, voltages are applied in the relation of Vd1>Vc>Vd2 as below:

Driving voltage Vd1=+40V (FIG. 14A)
Driving voltage Vd2=0V (FIG. 14B)
Control voltage Vc=+10V (FIG. 14C).

Thereby upward electric vectors are formed (as shown by the arrow marks) sufficiently for pulling up electrophoretic particles 3 from first display electrode 5a as shown in FIG. 15B. Thereby all of electrophoretic particles 3 climb over the large level difference (height of stage 4) to migrate to second display electrode 5b. As the result, second display electrode 5b is covered by black charged electrophoretic particles 3, thereby the pixel displaying a black color (black display at reflectivity of about 5%) (FIG. 14D). The above electric field is formed to be utilized effectively for the migration of electrophoretic particles 3, enabling decrease of the driving voltage. In such a driving method which is one of the features of the present invention, electrophoretic particles 3 are completely allowed to migrate even with a large level difference between the display electrodes, differently from the known construction (Japanese Patent Publication No. 02,740,048).

After the time Tb, the voltages are applied in the same manner as in the period 0–Ta, whereby charged electrophoretic particles are pushed toward the second display electrode by the controlled voltage Vc=+80V, and prevented from migration to first display electrode 5a. Thereby the black display is retained.

A process of driving plural pixels in one-way writing is explained by reference to FIGS. 16A to 16G. In this explanation, first control electrode 6a is connected to a scanning electrode line, first display electrode 5a is connected to a signal electrode line, and second display electrode 5b is grounded.

Figure 16A:
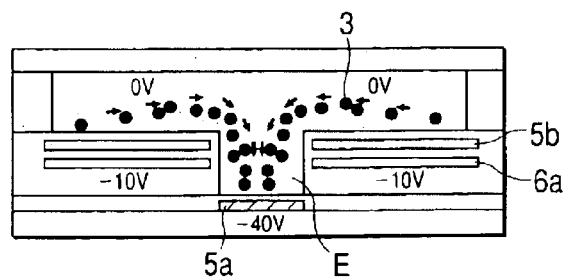
FIGS. 16A, 16B, 16C, 16D, 16E, 16F and 16G illustrate schematically migration of electrophoretic particles 3 and a state of electric field vectors in one-way writing.

Firstly a voltage Vc=−10V is applied to all of the scanning electrode lines, and a voltage of Vd1=−40V is applied to all of the signal electrode lines. Thereby in the respective pixels, charged electrophoretic particles 3 are allowed to migrate to hollow E, whereby all of the pixels are reset into a white state, as shown in FIG. 16A.

Figure 16B:
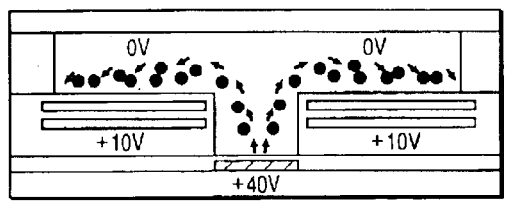
Figure 16C:
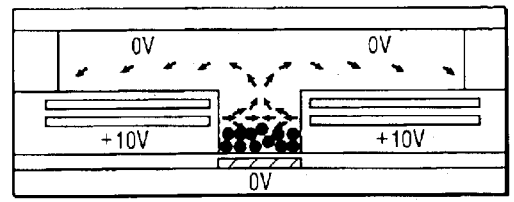
Figure 16D:
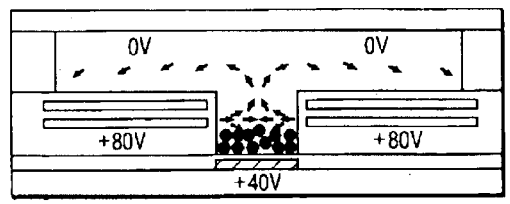

The writing is conducted by selecting sequentially the scanning electrode lines. In the selection period, a write-permitting voltage Vc=+10V is applied to the scanning electrode lines, and signals corresponding to the image to be displayed are applied to the respective signal electrodes. For example, a voltage Vd1=+40V is applied to the pixels to which a black state is to be written in to cause migration of charged electrophoretic particles 3 to cover second display electrode 5b as shown in FIG. 16B. To the pixels which should be kept in a white state (to be kept in the reset state as shown in FIG. 16A), voltages of Vd1=0V and Vc=+10V are applied (FIG. 16C). As described above, one-way writing for the black state is conducted only to intended pixels in the selection period.

Figure 16E:
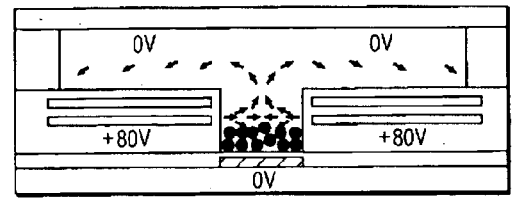
Figure 16F:
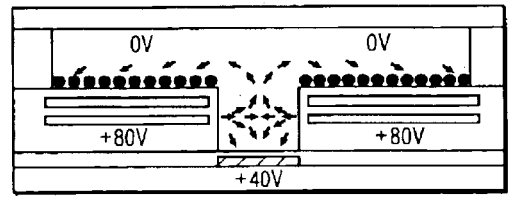
Figure 16G:
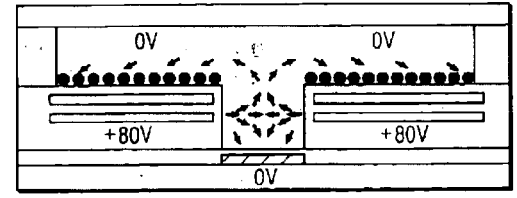

On the other hand, in the non-selection period, a voltage Vc=+80V is applied to first control electrode 6a to produce an electric gate barrier between the counterposing portions of the first control electrode 6a to inhibit passage of electrophoretic particles 3. As the result, the display states are retained satisfactorily in the state of application of black writing signal to signal electrode lines (FIGS. 16D to 16F), and the state of non-application of the black writing signals to the signal electrode lines (FIGS. 16E to 16G).

Figure 32A:
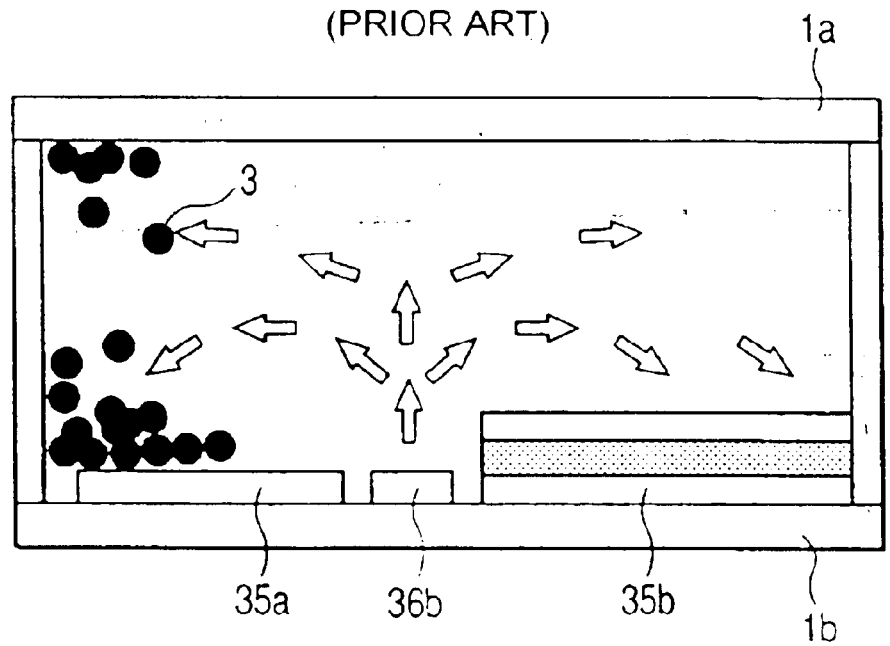
FIGS. 32A and 32B are drawings for explaining the problem in a conventional electrophoretic display unit.
Figure 32B:
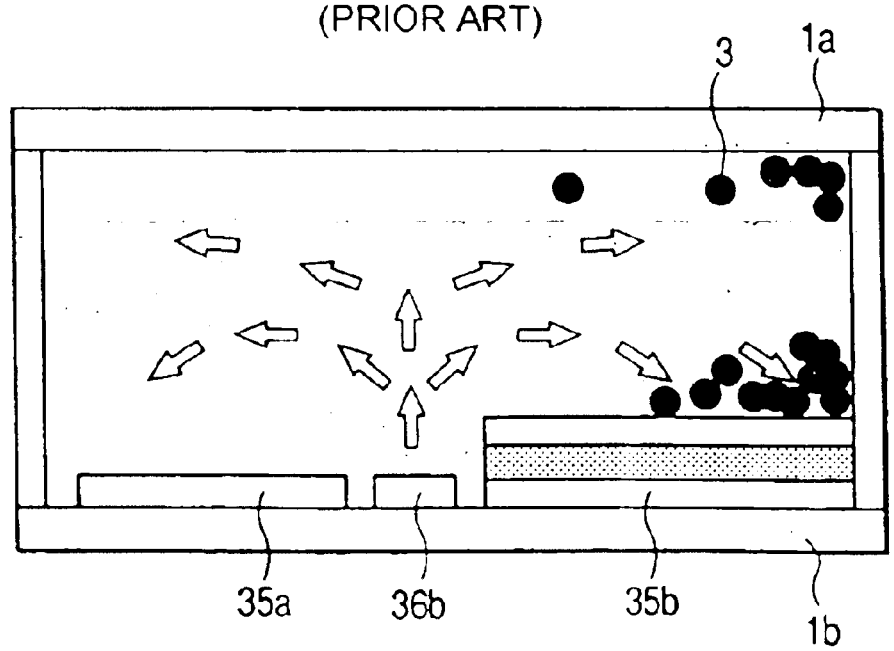

In the constitution of the present invention, an electric field which pushes down the electrophoretic particles vertically against the display electrode is generated near display electrodes 5a and 5b. Therefore, nonuniform distribution of electrophoretic particles 3 on display electrode planes, or sticking thereof onto the upper substrate, or a like problem do not occur which are caused in the second constitution as described in Japanese Patent Application International Publication No. 8-507154 (FIGS. 32A and 32B).

As described above, for practicing the simple matrix driving, four states of "a black-writing state", "a white-writing state", a black display-retaining state", and "a white display-retaining state" should be formed by applying suitable voltages to first display electrode 5a, second display electrode 5b, and first control electrode 6a to generate an electric field to control the migration of the electrophoretic particles. These four states can be formed by the display unit of the present invention. This is explained below by simulation (FIGS. 37 to 41). The electric field generated in the display element was calculated by a finite element method. The electric field vectors are shown by arrow marks. The equipotential lines are shown by solid lines. This simulation model is the minimum periodic structure of an electrophoretic display unit having periodicity.

Figure 37:
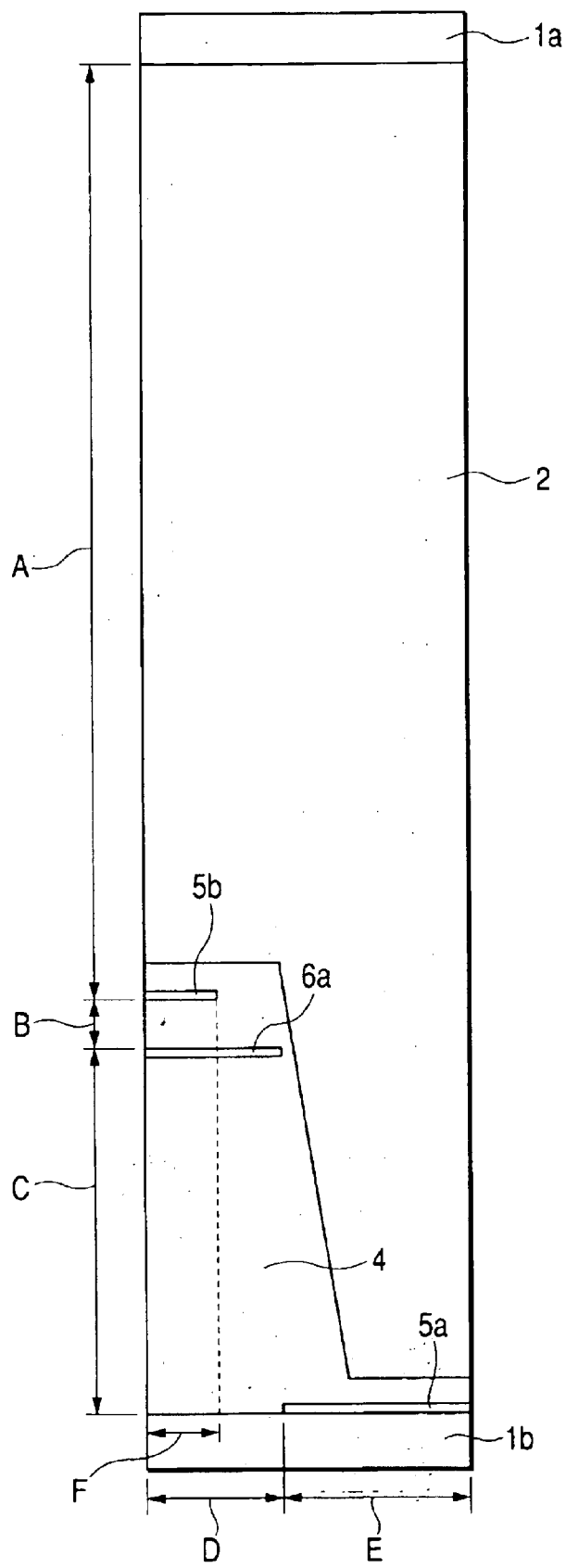
FIG. 37 is a detailed sectional view of an electrophoretic display unit.
Figure 38:
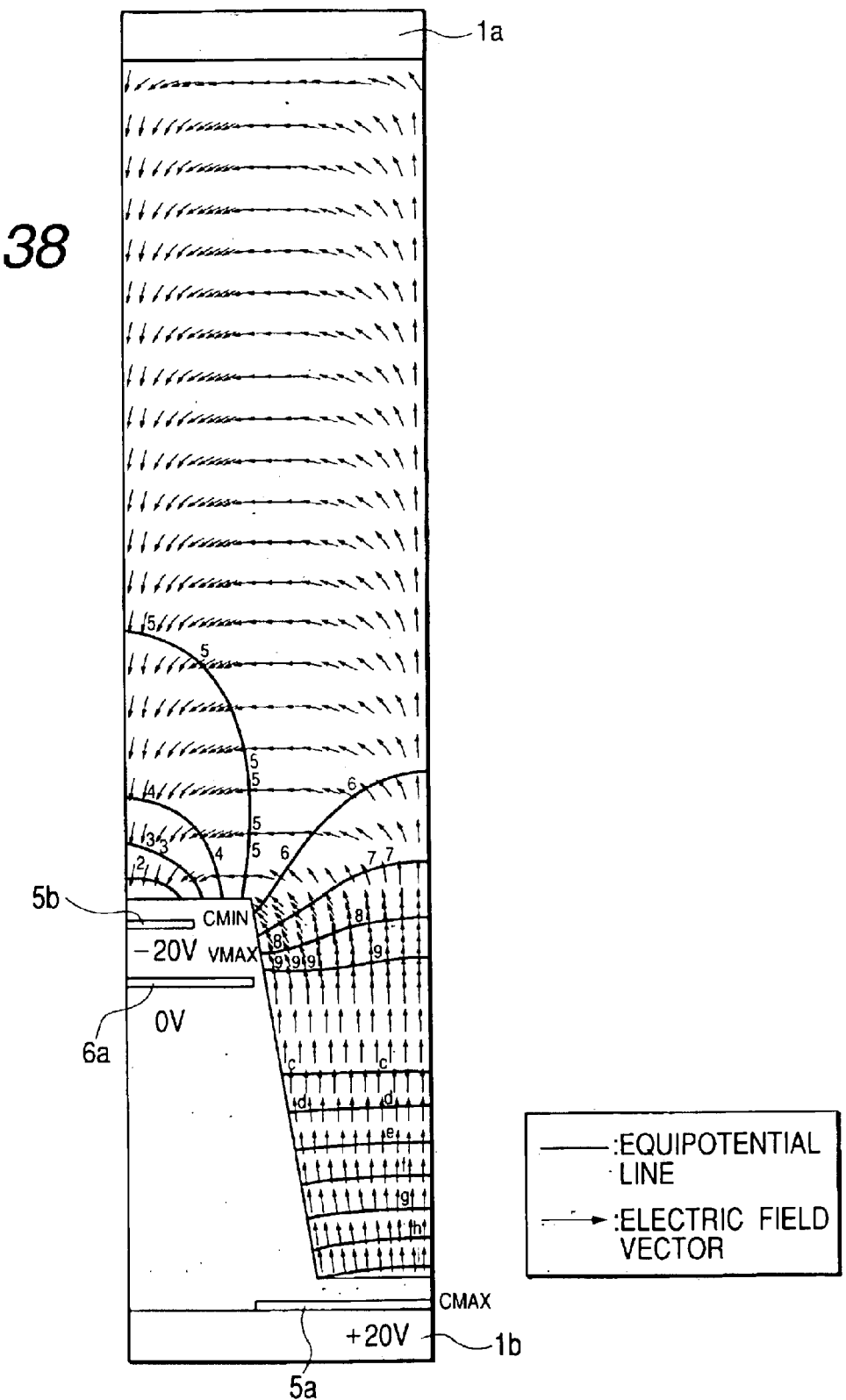
FIG. 38 shows a result of simulation of a black writing state.
Figure 39:
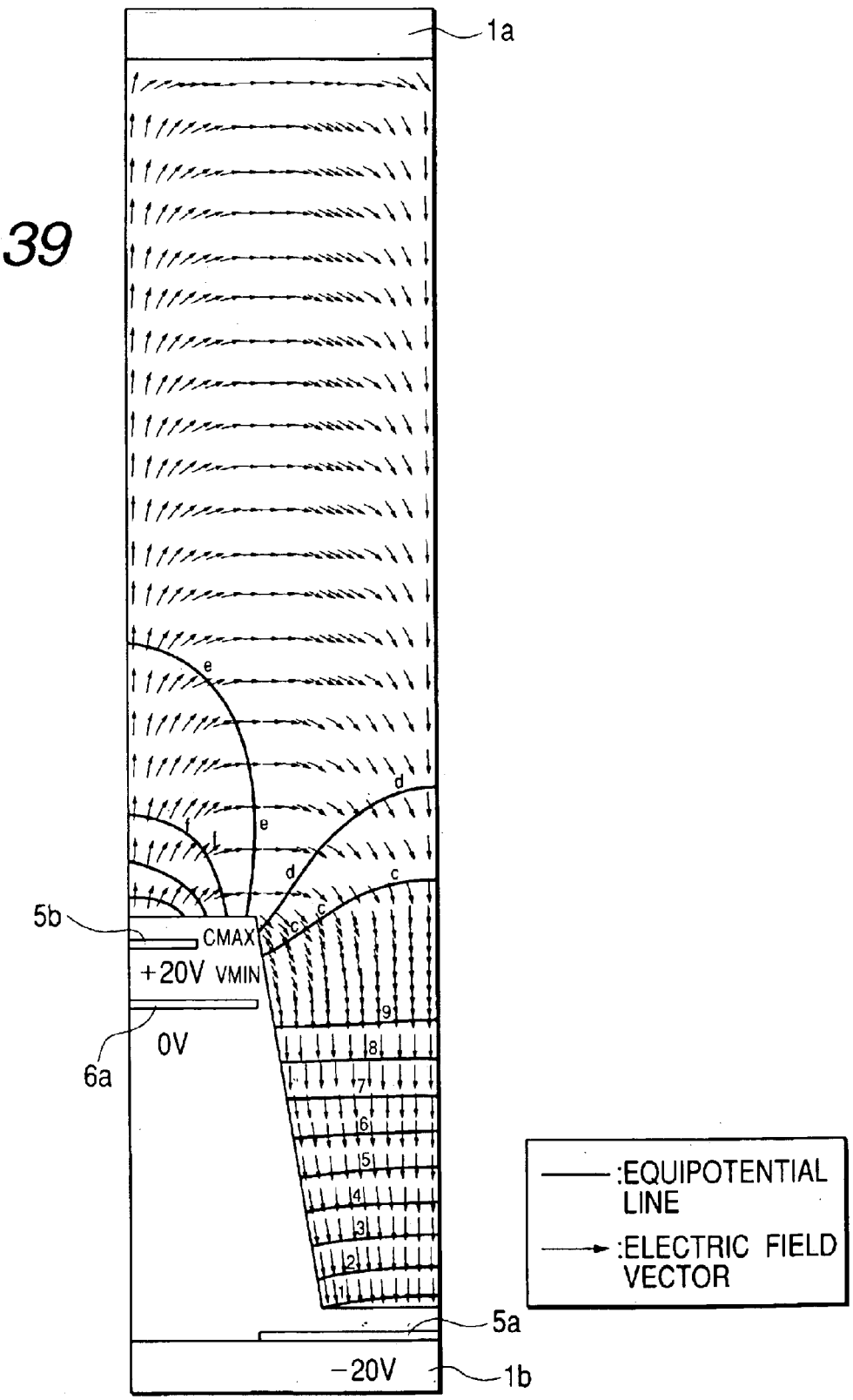
FIG. 39 shows a result of simulation of a white writing state.
Figure 40:
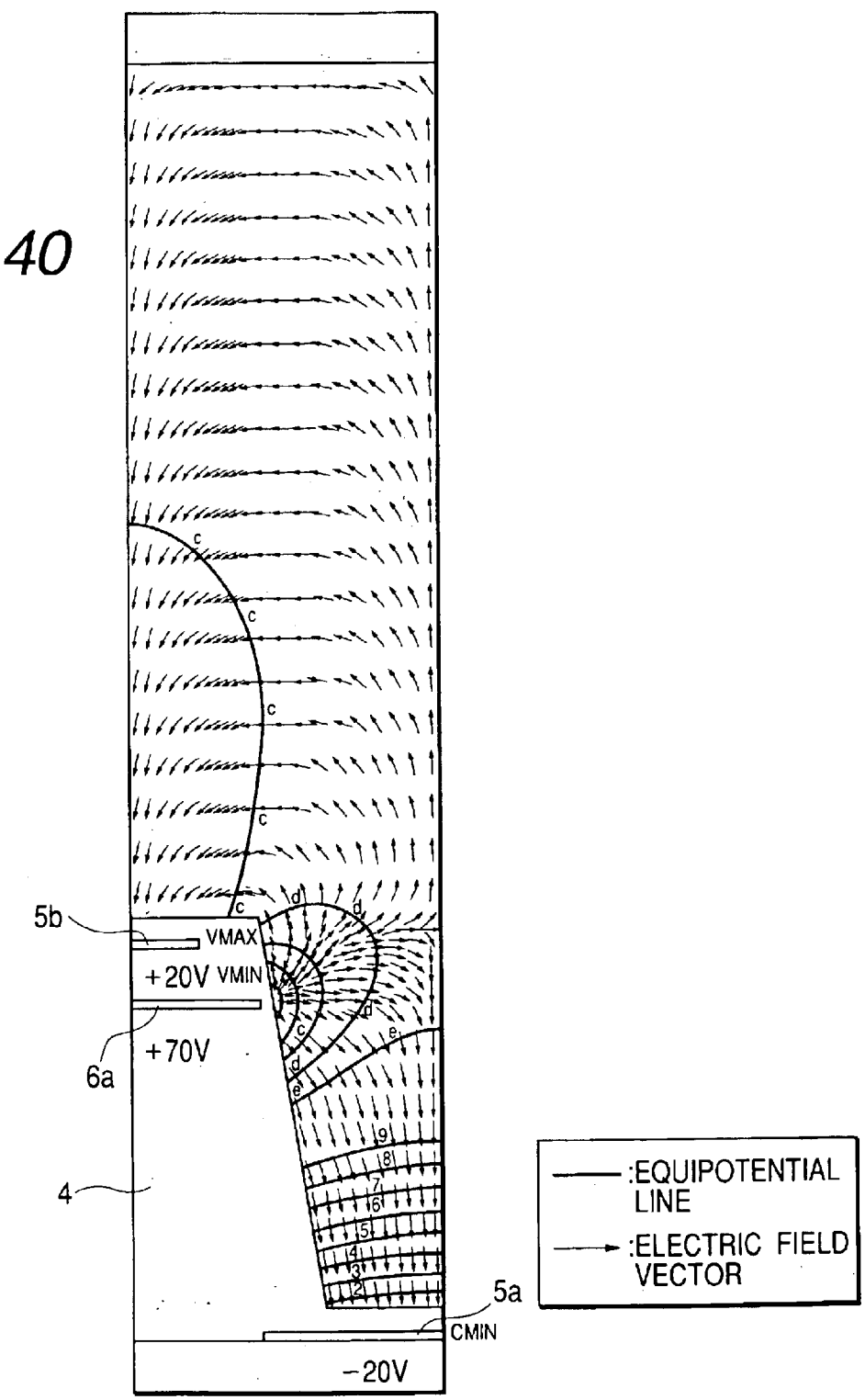
FIG. 40 shows a result of simulation of a black-retaining state.
Figure 41:
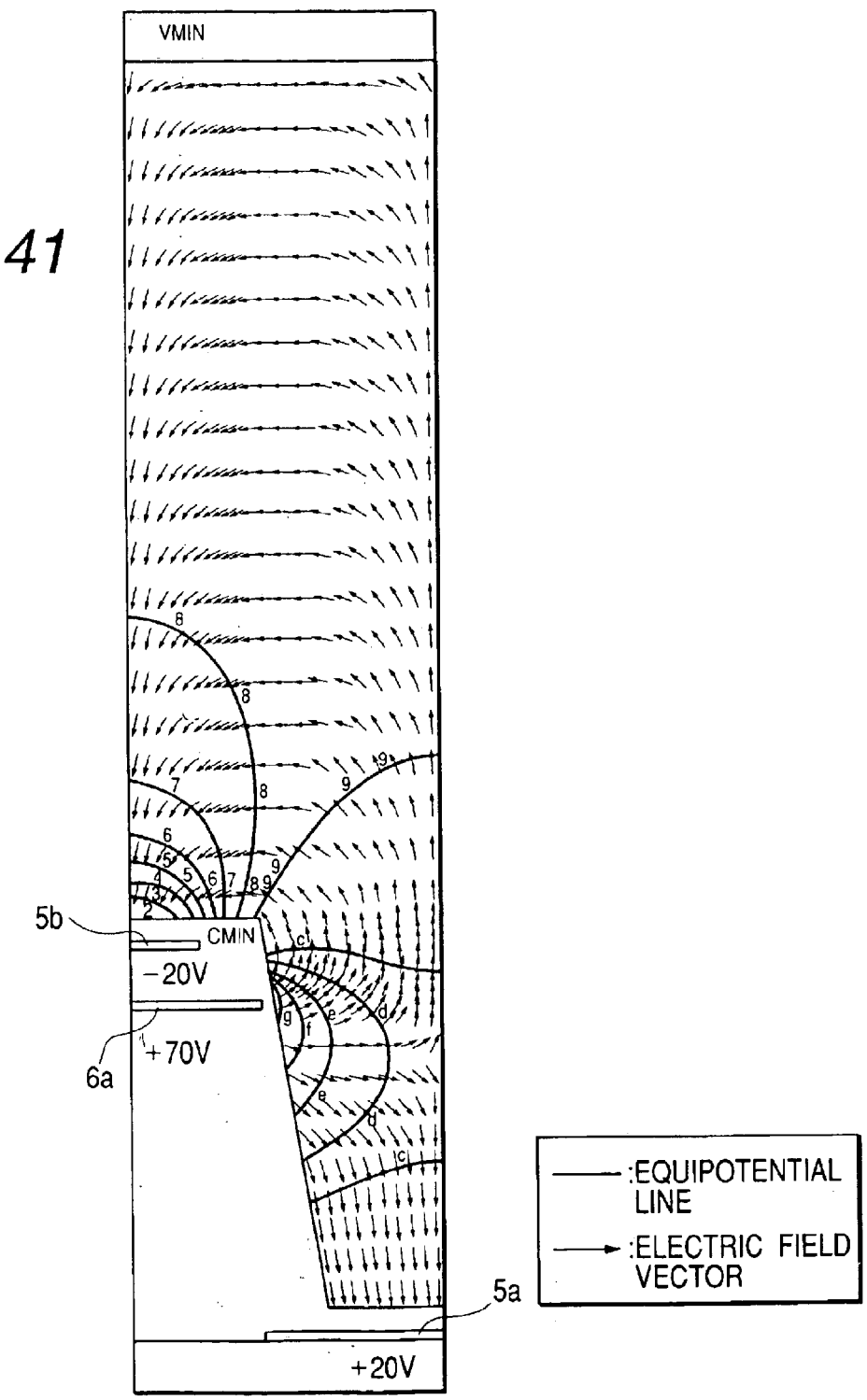
FIG. 41 shows a result of simulation of a white-retaining state.

FIG. 37 shows roughly the simulation model. FIG. 37 corresponds to a half period of FIG. 34A. As shown herein, the length of circumference of the through-hole of the second display electrode is designed longer than that of the first control electrode. The dimensions in FIG. 37 are: A=50 μm; B=3 μm; C=20 μm; D=7.5 μm; E=10.5 μm; and F=4 μm. FIG. 38 shows the simulation result for a black-writing state. FIG. 39 shows the simulation result for a white-writing state. FIG. 40 shows the simulation result for a black-retaining state. FIG. 41 shows the simulation result for a white-retaining state. The voltages applied to the electrodes are shown in Table 1 below.

TABLE 1

| Object | Voltage applied to electrode | | |
| --- | --- | --- | --- |
|  | First display electrode | Second display electrode | First control electrode |
| Black writing | +20 V | −20 V | 0 V |
| White writing | −20 V | +20 V | 0 V |
| Black retention | +20 V | −20 V | +70 V |
| White retention | −20 V | +20 V | +70 V |

The results are briefly explained below. In this explanation, the electrophoretic particles are positively charged. Thus the charged particles are driven along the vector directed from the higher potential to the lower potential shown by arrow marks.

FIG. 38 shows an electric field generated by a voltage applied to the electrodes for black writing display. In this FIG. 38, the vectors of the electric field generated are directed from the first display electrode 5a upward onto the second display electrode 5b as shown by arrow marks, indicating the direction of migration of the electrophoretic particles. The electrophoretic particles can be driven onto the second display electrode 5b. Thus the electric field for black writing is formed.

FIG. 39 shows an electric field generated for white writing display. In this FIG. 39, the vectors of the electric field generated are directed to the first display electrode 5a. Thus the electric field for white writing is formed.

FIG. 40 and FIG. 41 show respectively an electric field for retaining a white-displaying state and an electric field for retaining a black-displaying state. In either case, the generated vectors direct upward and downward from the level of first control electrode 6a formed at the middle level of stage 4. Thus the electric field is generated for the white display retention or the black display retention. Therefore, for retaining the first displaying state in which the charged electrophoretic particles are accumulated on the first display electrode, the accumulated charged electrophoretic particles should be in the range of the downward-directing electric vectors in FIGS. 40 and 41. This decides the height-level of first control electrode 6a above lower level surface F1.

According to the above simulation, the novel constitution of the present invention is understood to generate the electric fields for "black writing", "white writing", "black retention", and "white retention" for the simple matrix driving.

(High-Speed Writing)

FIGS. 16A to 16G show another driving principle.

In this embodiment, in migration of charged electrophoretic particles 3 from a display electrode (e.g., first display electrode 5a) to the other display electrode (e.g., second display electrode 5b), a first process is conducted to transport charged electrophoretic particles 3 from one display electrode (e.g., first display electrode 5a) to a vicinity of first control electrode 6a. In this first process, $$V(strt) > V(ctrl) > V(objt)$$

where V(strt) indicates a driving voltage of the display electrode from which the electrophoretic particles start, V(ctrl) indicates a control voltage of first control electrode 6a, and V(objt) indicates a driving voltage of the objective display electrode to which the electrophoretic particles are transported. In the case where charged electrophoretic particles 3 are negatively charged, the above two inequality signs should be reversed.

After the first process in this embodiment, a second process is conducted in which the charged electrophoretic particles 3 having been transported to the vicinity of first control electrode 6a in the first process are further transported to the other display electrode (e.g., second display electrode 5b). In this second process, the potential of first control electrode 6a is raised to be higher than that in the first process to accelerate the transportation of the charged electrophoretic particles to the objective display electrode to enable high-speed switching of the display. Such high-speed writing cannot readily be realized by the constitution disclosed in Japanese Patent Application International Publication No. 8-507154.

Figure 18A:
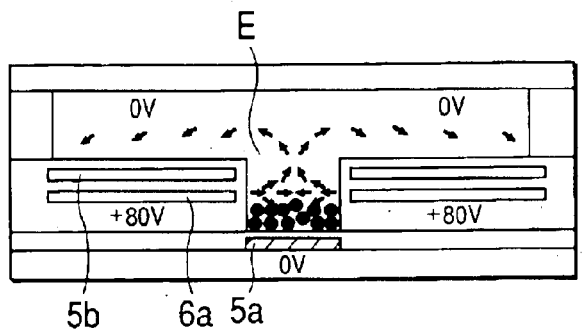
FIGS. 18A, 18B, 18C and 18D illustrate schematically migration of electrophoretic particles 3 and a state of electric field vectors in driving in a manner as shown in FIGS. 17A to 17D.

The high-speed writing is further explained below by reference to FIGS. 17A to 17D and FIGS. 18A to 18D. FIGS. 17A to 17D are timing charts showing changes of the applied voltages and in the reflectivity in reversal from a white state to a black state of a pixel after the white-retaining state: FIG. 17A showing the change of the driving voltage Vd1 applied to first display electrode 5a; FIG. 17B showing the change of the driving voltage Vd2 applied to second display electrode 5b; FIG. 17C showing the change of the control voltage Vc applied to first control electrode 6a; and FIG. 17D showing the change in the reflectivity. FIGS. 18A to

Figure 18B:
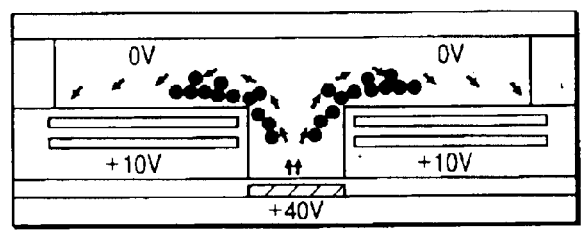
Figure 18C:
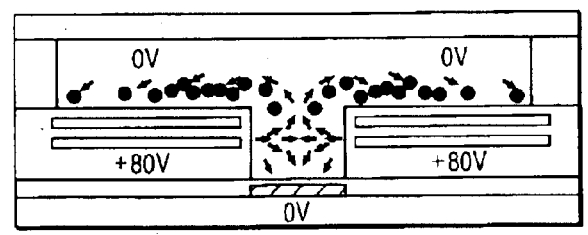
Figure 18D:
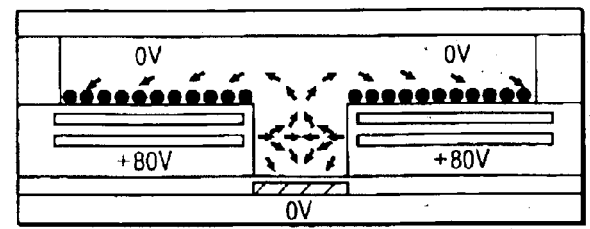

18D illustrate schematically the migration of charged electrophoretic particles 3, and the state of the electric field vector in the driving as shown in FIGS. 17A to 17C: FIG. 18A illustrating the state during the period 0–Ta; FIG. 18B illustrating the state during the period Ta-Tc; FIG. 18C illustrating the state during the period Tc-Tb; and FIG. 18D illustrating the state after the time Tb. In this explanation, electrophoretic particles 3 are positively charged, first display electrode 5a is black in color, and second display electrode 5b is white in color.

In a state that charged electrophoretic particles 3 are accumulated in hollow E by adsorption to first display electrode 5a, in the period 0–Ta, as shown in FIG. 18A, voltages are applied as below:
Driving voltage Vd1=0V (FIG. 17A)
Driving voltage Vd2=0V (FIG. 17B)
Control voltage Vc=+80V (FIG. 17C).
The control voltage Vc produces an electric gate barrier between the counterposing portions of the first control electrode 6a. Charged electrophoretic particles 3 are pushed thereby toward the display electrode to be enclosed in hollow E. As the result, second display electrode 5b is visually recognizable from the outside more clearly than charged electrophoretic particles 3, thereby the pixel displaying a white color (white display at reflectivity of about 70%).

In the subsequent period Ta-Tc, voltages are applied in the relation of Vd1>Vc>Vd2 as below:
Driving voltage Vd1=+40V (FIG. 17A)
Driving voltage Vd2=0V (FIG. 17B)
Control voltage Vc=+10V (FIG. 17C).
Thereby upward electric field vectors are generated (as shown by the arrow marks in FIG. 18B) for pulling up all electrophoretic particles 3 from first display electrode 5a. Thus, all of electrophoretic particles 3 are pulled up from first electrode 5a to first control electrode 6a as the first step.

At the time when all of electrophoretic particles 3 have migrated to the vicinity of first control electrode 6a (or above first control electrode 6a), the control voltage of first control electrode 6a is changed to Vc=+80V in the period Tc-Tb (FIG. 17C) as the second step. This control voltage generates electric field vectors to impel electrophoretic particles 3 to migrate to second display electrode 5b, which accelerates the migration of the particles 3, causing migration of all of electrophoretic particles 3 onto second display electrode 5b (FIG. 18C). Thereby, second display electrode 5b is covered with the black charged electrophoretic particles, and the pixel displays a black color (black display at reflectivity of about 5%) (FIG. 18D).

In the period after Tb, the same voltages as in the period 0–Ta are applied to the respective electrodes. Thereby electrophoretic particles 3 are pushed by the control voltage Vc=+80V toward the second display electrode side so as not to migrate to first display electrode 5a, and the black display is retained at a reflectivity of about 5% (FIG. 18D).

The high-speed writing is conducted by the above driving method. In this driving method, the writing voltage is applied only in the period Ta-Tc in which charged electrophoretic particles 3 are pulled up to the vicinity of first control electrode 6a. This is different from the driving method shown in FIGS. 14A to 14D in which the writing voltage is applied throughout the period Ta-Tb (the period in which charge electrophoretic particles 3 are transported from first display electrode 5a to second display electrode 5b). This simple matrix driving method realizes high-speed writing. That is, when electrophoretic particles 3 have migrated to the vicinity of control electrode 6a and the control voltage (Vc=+80V) is added to control electrode 6a in that state, the electric field vectors are formed which push electrophoretic particles 3 toward second display electrode 5b, and thereafter the electrophoretic particles 3 are allowed to migrate independently of the voltage applied to first display electrode 5a. Accordingly, in the simple matrix driving conducted by selecting scanning electrode lines sequentially, the rewriting time for one scanning electrode line can be shortened. In other words, the rewriting time is shortened from the period Ta-Tb (period for migration of electrophoretic particles 3 from first display electrode 5a to second display electrode) to the shorter period Ta-Tc (for the migration thereof from first display electrode 5a to the vicinity of control electrode 6a). Therefore, the high-speed writing drive of the present invention is greatly advantageous for a finer structure and a larger image size of the display apparatus.

(Driving Operation of Second Control Electrode)

The method of driving electrophoretic display unit D3 having second control electrode 6b on the second substrate as shown in FIG. 12 is explained by reference to FIGS. 19A to 19E and FIGS. 20A to 20C. The driving method described below can be similarly applied to the construction in which the first control electrode jut out partially from the second display electrode as shown in FIGS. 42A and 42B.

Figure 19A:
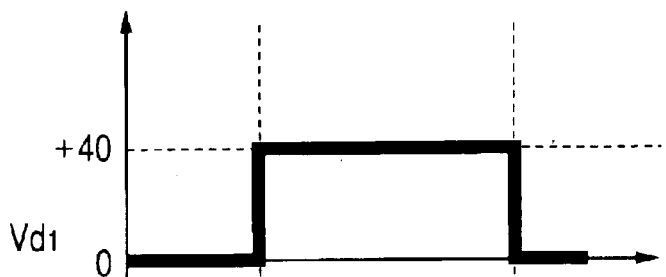
FIGS. 19A, 19B, 19C, 19D and 19E are timing charts showing change of the applied voltage and reflectivity in a pixel in a process of retention of a white-color state and subsequent reversal to a black-color state.
Figure 19B:
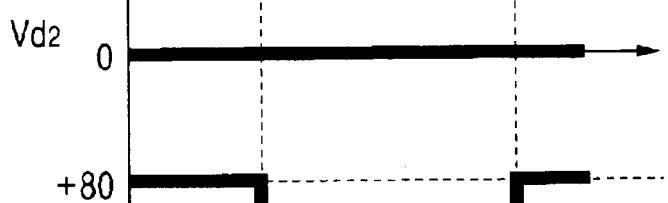
Figure 19C:
Figure 19D:
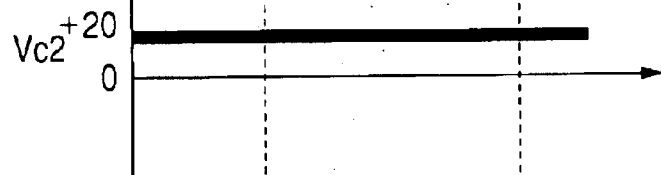
Figure 19E:
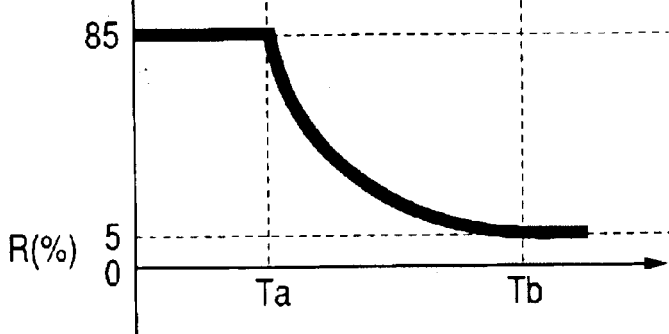
Figure 20A:
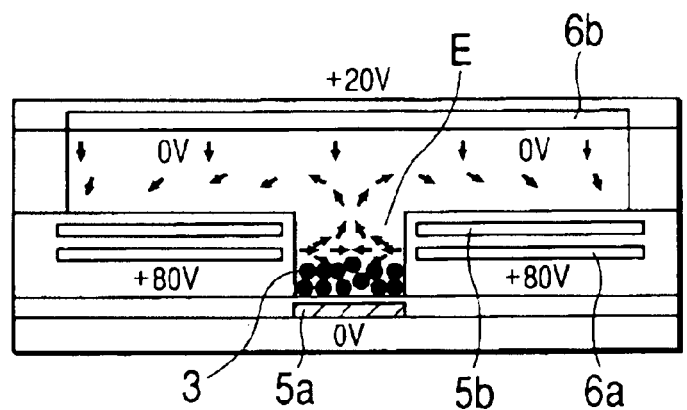
FIGS. 20A, 20B and 20C illustrate schematically migration of electrophoretic particles 3 and a state of electric field vectors in driving in a manner as shown in FIGS. 19A to 19E.
Figure 20B:
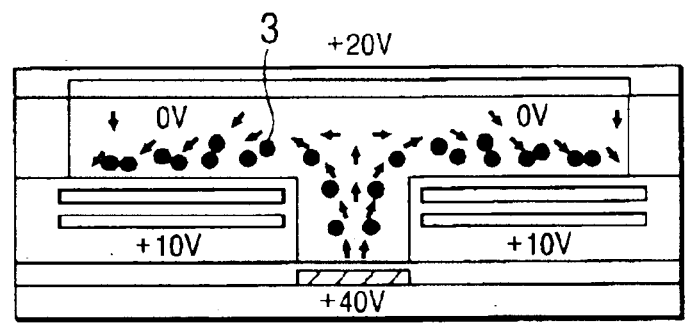
Figure 20C:
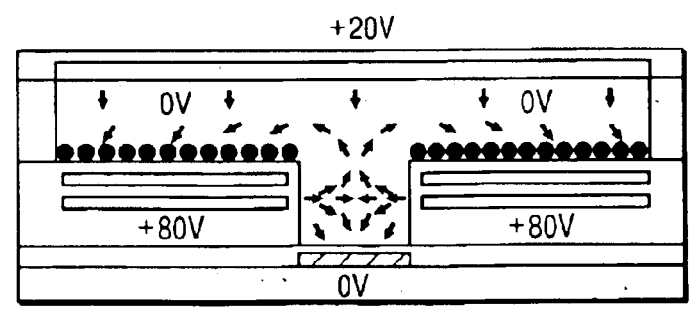

FIGS. 19A to 19E are timing charts showing changes of the applied voltages and in reflectivity in the reversal from a white state to a black state of a pixel after the white-retaining state: FIG. 19A showing the change of the driving voltage Vd1 applied to first display electrode 5a; FIG. 19B showing the change of the driving voltage Vd2 applied to second display electrode 5b; FIG. 19C showing the change of the control voltage Vc1 applied to first control electrode 6a; FIG. 19D showing the change of the control voltage Vc2 applied to second control electrode 6b; and FIG. 19E showing the change in the reflectivity. FIGS. 20A to 20C illustrate schematically the migration of charged electrophoretic particles 3, and the state of the electric field vector in the driving shown in FIGS. 19A to 19D: FIG. 20A illustrating the state during the period 0–Ta; FIG. 20B illustrating the state during the period Ta-Tb; and FIG. 20C illustrating the state after the time Tb. In this explanation, electrophoretic particles 3 are positively charged, first display electrode 5a is black in color, and second display electrode 5b is white in color. Throughout the above periods, second display electrode 5b is grounded (Vd2=0V in FIG. 19B), and a voltage Vc2=+20V is applied to second control electrode 6b (FIG. 19D).

For one-way writing by this driving method, the pixels are entirely reset initially.

In a state that charged electrophoretic particles 3 are accumulated in hollow E by adsorption onto first display electrode 5a, in the period 0–Ta, as shown in FIG. 20A, voltages are applied as below:
Driving voltage Vd1=0V (FIG. 19A)
Driving voltage Vd2=0V (FIG. 19B)
Control voltage Vc1=+80V (FIG. 19C).
Control voltage Vc2=+20V (FIG. 19D).
The control voltage Vc1 produces an electric gate barrier between the counterposing portions of the first control electrode 6a. Charged electrophoretic particles 3 are pushed thereby toward the display electrode to be enclosed in hollow E. As the result, second display electrode 5b is visually recognizable from the outside more clearly than charged electrophoretic particles 3, thereby the pixel displaying a white color (white display at reflectivity of about 70%).

In the subsequent period Ta-Tb, voltages are applied in the relation of Vd1>Vc1>Vd2, and Vd1>Vc2>Vd2 as below:

Driving voltage Vd1=+40V (FIG. 19A)
Driving voltage Vd2=0V (FIG. 19B)
Control voltage Vc1=+10V (FIG. 19C)
Control voltage Vc2=+20V (FIG. 19D).

Under the conditions of Vd1>Vc1>Vd2, upward electric field vectors are formed (as shown by the arrow marks in FIG. 20B) for pulling up electrophoretic particles 3 from first display electrode 5a (arrows in the drawing). This effect is increased by application of a steady-state voltage to second control electrode 6b under the conditions of Vd1>Vc2>Vd2 to form sufficiently the upward electric field vectors for pulling up electrophoretic particles 3. Thereby all of electrophoretic particles 3 climb over the large step difference (level difference of stage 4) and migrate to second display electrode 5b. Accordingly, even in a construction having a level difference of stage 4 of several ten times larger than the size of charged electrophoretic particles 3, charged electrophoretic particles 3 will not remain at all in hollow E.

Thereafter in the period after Tb, the same voltages as in the period 0–Ta are applied to the respective electrodes. Thereby electrophoretic particles 3 are pushed by the control voltages Vc1=+80V and Vc2=+20V toward the second display electrode side not to migrate to first display electrode 5a, the black display being retained at a reflectivity of about 5%.

The effects of this embodiment are explained below.

The remarkable feature of the constitution of the present invention is placement of first display electrode 5a along lower level surface F1, placement of second display electrode 5b along upper level surface F2, and placement of first control electrode 6a between these display electrodes. Such stepped arrangement of the electrodes solves the problems of conventional electrophoretic display unit (i.e., of the one disclosed in Japanese Patent Application International Publication No. 8-507154), and achieved the effects enumerated below.

(1) Suppression of Cross Talk

Figure 33A:
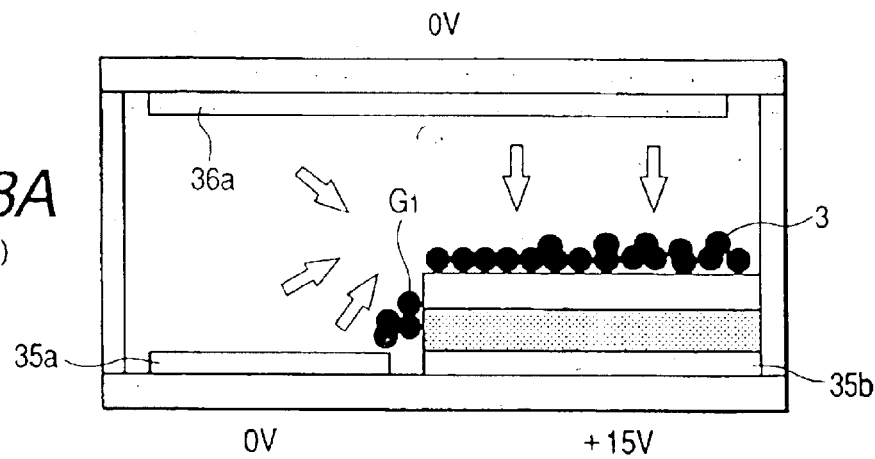
FIGS. 33A, 33B and 33C are drawings for explaining the problem in another conventional electrophoretic display unit.

In conventional electrophoretic display units, with the level difference as shown by symbol G1 in FIG. 33A, a part of charged electrophoretic particles 3 may not climb over the level difference and remain on the lower level surface, which lowers the display contrast disadvantageously.

To offset the above disadvantage, all of charged electrophoretic particles should migrate entirely (without remaining) between first display electrode 5a placed on lower level surface F1 and second display electrode 5b placed on upper level surface F2. In the electrophoretic display unit of the present invention has first control electrode 6a arranged between the display electrodes 5a and 5b, and application of a suitable voltage at a suitable timing to first control electrode 6a enables smooth migration of charged electrophoretic particles 3 even with large level difference of stage 4 without remaining of the particles on lower level surface F1, whereby the lowering of display contrast is avoided.

Figure 33B:
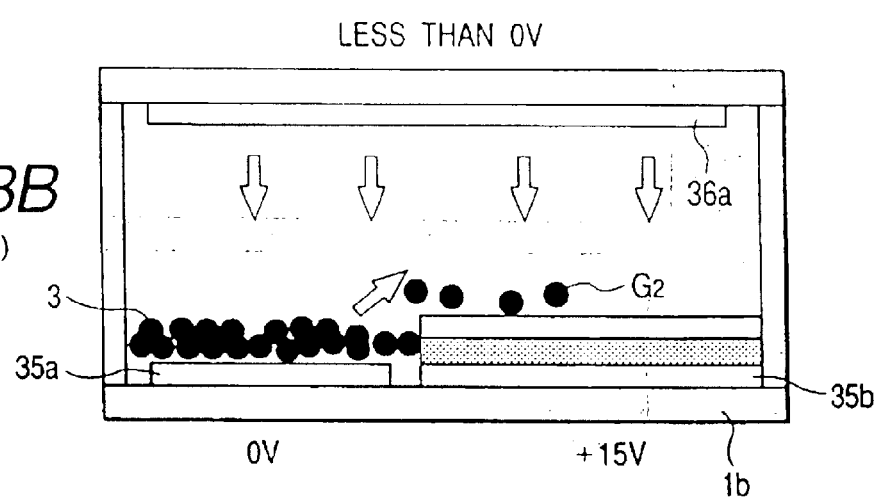
Figure 33C:
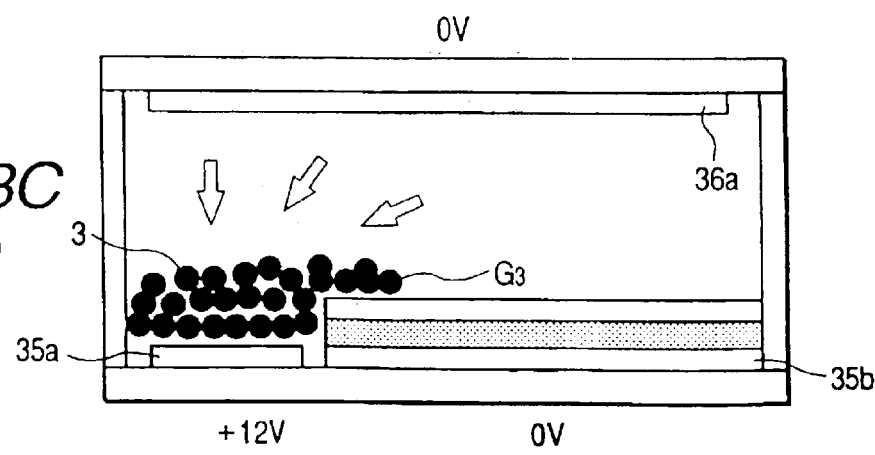

In the display unit of the present invention, since the level difference need not be made lower, migration of charged electrophoretic particles 3 can be suppressed sufficiently by the level difference. Therefore, the undesired migration of charged electrophoretic particles shown by symbol G2 in FIG. 33B can be stopped.

The present invention realizes simple matrix driving of horizontal migration type electrophoretic units without causing cross talk with stable display contrast. This results from the novel construction and driving method which prevents nearly completely failure in writing with electrophoretic particles in selected pixels and cross talk caused by insufficient retention of electrophoretic particles in selected pixels, differently from conventional display units.

(2) Lower Power Consumption

Conventional units, in which the level difference is smaller, need application of a higher voltage to grid lines 36a for stopping the migration of electrophoretic particles 3.

According to present invention, the migration of electrophoretic particles can be effectively controlled by an electric gate barrier produced by first control electrode 6a, which enables decrease of the voltage applied to control-electrode 6a (decrease of driving voltage).

In other words, in the constitution of the present invention, all of electrophoretic particles 3 migrate between second display electrode 5b placed on the upper level surface and first display electrode placed on the lower level surface through the gap between the counterposing portions of the control electrode 6a placed at the middle level of the level difference. Therefore, the migration of electrophoretic particles can be controlled effectively by electric gate barrier produced by relatively low voltage applied to control-electrode 6a. Thereby the control voltage can be lowered.

In the constitution in which the first display electrode and the second display electrode (namely, cathode electrode 35a and anode electrode 35b) are placed side by side on the same plane like the one disclosed in Japanese Patent Application International Publication No. 8-507154, a vertical electric field is also generated in addition to the electric field for horizontal migration of electrophoretic particles 3. This is disadvantageous in effective use of the applied voltage. However, in the constitution of the present invention, first display electrode 5a and second display electrode 5b are placed at different levels, whereby the generated vertical electric field can be utilized effectively for the migration of electrophoretic particles 3 between the display electrodes, which decreases the rewriting voltage.

(3) Improvement of Display Contrast

In the present invention, the height level difference made by stage 4 can be designed to be sufficiently high to accommodate all of electrophoretic particles 3 in hollow E. Thus, the area of first display electrode 5a can be designed smaller to increase the area ratio of first display electrode 5a to second display electrode 5b to increase the display contrast.

On the contrary, in the electrophoretic display unit disclosed in Japanese Patent Application International Publication No. 8-507154, in which cathode element 35a and anode element 35b should be separated for insulation, the area for cathode element 35a (or the area for anode element 35b) is necessarily decreased for the separation interval, resulting in the drop of display contrast, disadvantageously.

However, in the present invention, first display electrode 5a and second display electrode 5b are placed at different height levels (vertically stepped arrangement of the electrodes), so that no gap is necessary in horizontal direction in the plane for the insulation of the electrodes. Thereby higher display contrast can be achieved by the display unit of the present invention than conventional display units.

With the second display electrode in a form of linear electrodes, the contrast may be lowered by the breadth of the gap between the linear electrodes. Therefore, partition wall 7 is placed in the position of this gap to utilize the gap effectively. In contrast, with a planar electrode, although the display contrast can be made maximum, the voltages of the second display electrodes cannot be varied for the respective pixels, so that the driving is limited to one-way write driving method. (The write driving is explained later.)

(4) Ease of Production of Fine Display Units

With the construction of the conventional units in which fork-shaped elements 35a, 35b are arranged on one and the same plane, for finer display portions, the elements should be made finer and the gaps between the elements should be made smaller. This makes difficult the production of the fine display units owing to liability to electric short-circuit between the elements.

In contrast, with the stepped electrode arrangement of the present invention, the insulation between the electrodes is made sufficient vertically by stage 4, facilitating the production of a fine display units having fine display portion.

Figure 29A:
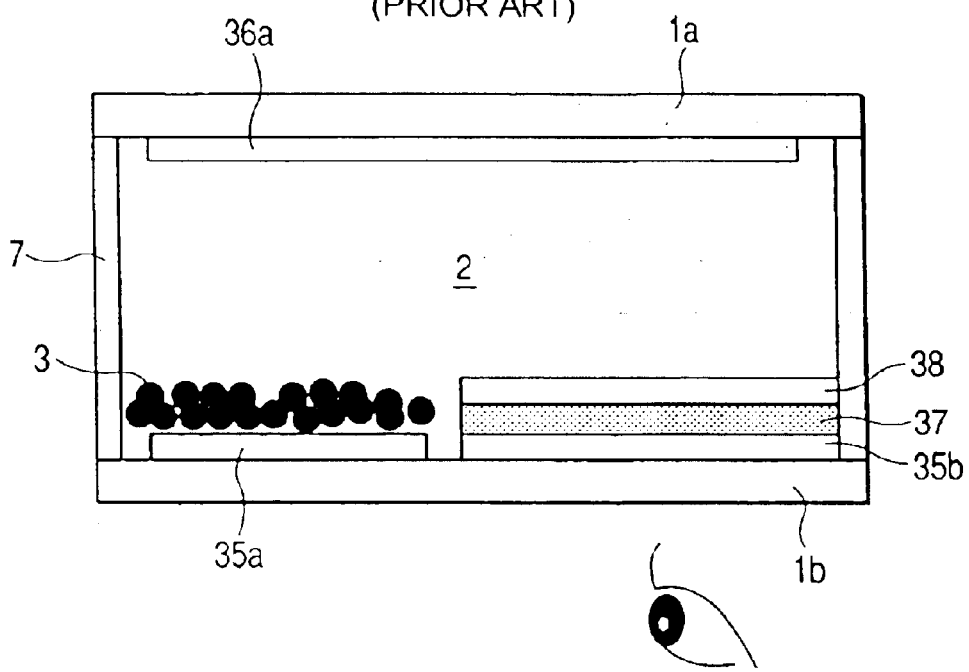
FIGS. 29A and 29B illustrates a structure of another conventional electrophoretic display unit.
Figure 29B:
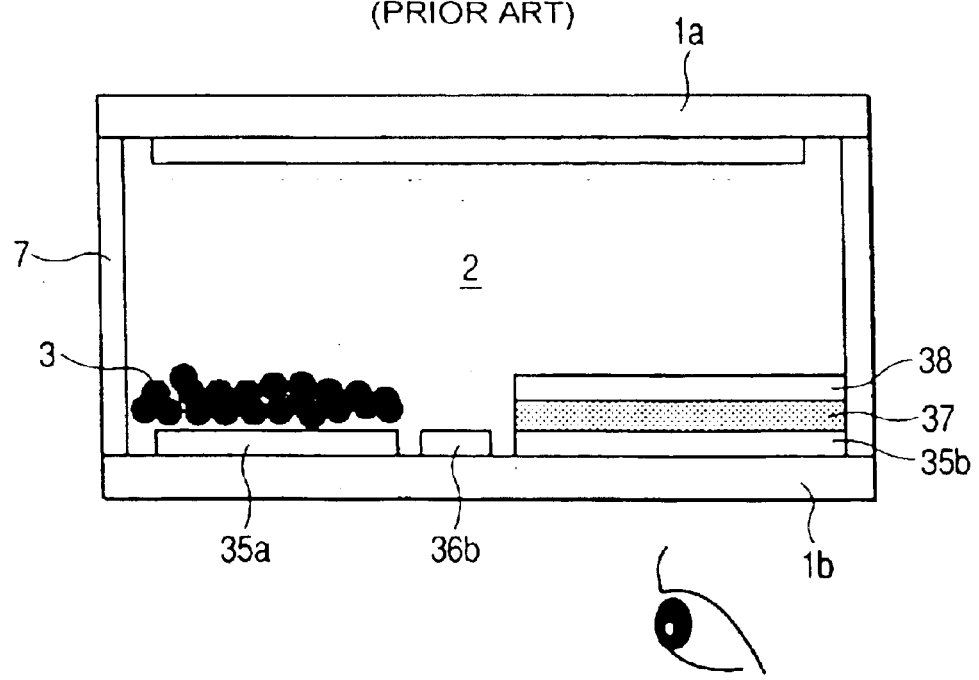

In this embodiment of the present invention, since first control electrode 6a and display electrodes 5a and 5b are placed on the same side of second substrate 1b, the display quality is not impaired by slight variation of the interspace between the substrates, differently from the aforementioned first constitution of the electrophoretic display unit (FIG. 29A). Therefore, substrates 1a and 1b may be made from a flexible material, and the positional registration can be simplified in the production process (simplification of the substrate bonding process).

(5) Applicability to Two-Way Write Driving

In the constitution of the present invention, rewriting of the display is conducted by migration of electrophoretic particles 3 between first display electrode 5a on the lower level surface and second display electrode 5b on the upper level surface. In this rewriting process, all of electrophoretic particles 3 pass through the aperture of control electrode 6a at the middle level of the stage. The migration of electrophoretic particles 3 can be inhibited by electric gate barrier produced by voltage application to control electrode 6a in the both directions from the upper level to the lower level and from the lower level to the upper level. Thereby two-way writing can be conducted, and a driving can be conducted for rewriting selectively a part of the image.

Therefore, initial resetting need not be conducted, and partial rewriting driving can be conducted to rewrite a part of the displayed image.

(6) Applicability to High-Speed Writing

Thus, an electrophoretic display apparatus can be provided which can conduct high-speed addressing by simple matrix driving for finer and larger display with increase of scanning line number.

(7) Miscellaneous

According to the present invention, the placement of first control electrode 6a between display electrodes 5a and 5b prevents uneven distribution of the electrophoretic particles shown in FIGS. 32A and 32B.

According to the present invention, the second display electrode plane covers the display portion other than the hollow portion formed by the stepped structure, whereby deterioration of display quality by leakage of the electric field from lead wiring can be prevented by shielding effect of the second display electrode.

The present invention is explained below in more detail by reference to examples.

EXAMPLE 1

In this Example, an electrophoretic display device was produced which has constitution shown in FIGS. 1A, 1B and FIG. 3, and the device was driven for two-way writing by simple matrix driving. Although FIG. 3 shows 3×3 elements only, the produced display device had 20×20 pixels. The one pixel had a size of 120 $\mu$m×120 $\mu$m, and the region P1 occupied by first display electrode 5a had an area of 30% of the pixel area, and the region P2 occupied by second display electrode 5b had an area of 70% of the pixel area (area ratio 3:7).

A process for producing the electrophoretic display device of this Example is described below.

On a PET film 1b of 200 $\mu$m thick as the second substrate, first display electrode 5a was formed by forming an Al film mid patterning the Al film by photolithography and wet-etching. On the surface of the electrode, was formed a dark black-colored layer 8.

Then, stage 4 was formed from an epoxy resin in a thickness of 20 $\mu$m. On the surface thereof, first control electrode 6a was formed by patterning by photolithography and wet etching. This first control electrode 6a was coated with an epoxy resin in a thickness of 4 $\mu$m to form a stage. On the surface thereof second display electrode 5b was formed by forming an Al film and patterning it by photolithography and wet etching.

Finally, by employing second display electrode 5b as the mask, the epoxy resin as the stage material was etched by reactive dry etching with an O2 gas to complete stage 4. The resulting structure had second display electrode 5b on stage 4 of 24 $\mu$m high, first control electrode 6a in a layer lower by 4 $\mu$m therefrom, and first display electrode 5a in a layer lower by 20 $\mu$m further therefrom. Then an insulating colored layer was formed on the entire face of the structure from an acrylic resin containing a white pigment like alumina dispersed therein.

Separately, on a PET film 1a of 200 $\mu$m thick as the first substrate, partition walls 7 of 50 $\mu$m high were formed on the boundary portions of the pixels by application of a photo-sensitive epoxy resin, exposure to light, and wet development. Into the inside regions surrounded by the formed partition walls, were filled insulating liquid 2 and black-colored electrophoretic particles 3. Insulating liquid 2 employed was a silicone oil. Black-colored electrophoretic particles 3 were formed from a mixture of polystyrene and carbon, having an average particle diameter of 2 $\mu$m. Electrophoretic particles 3 became charged positively in the silicone oil. Next, on the bonding face of first substrate 1a and second substrate 1b, a pattern of a heat-fusible bonding layer was formed. First substrate 1a was placed on the partition walls on second substrate 1b with registration, and the substrates were bonded together by heat application to complete a sheet-shaped display panel. This display panel was connected to a voltage application circuit not shown in the drawings, and was evaluated for driving performance.

Driving method in this Example is explained below.

Figure 21:
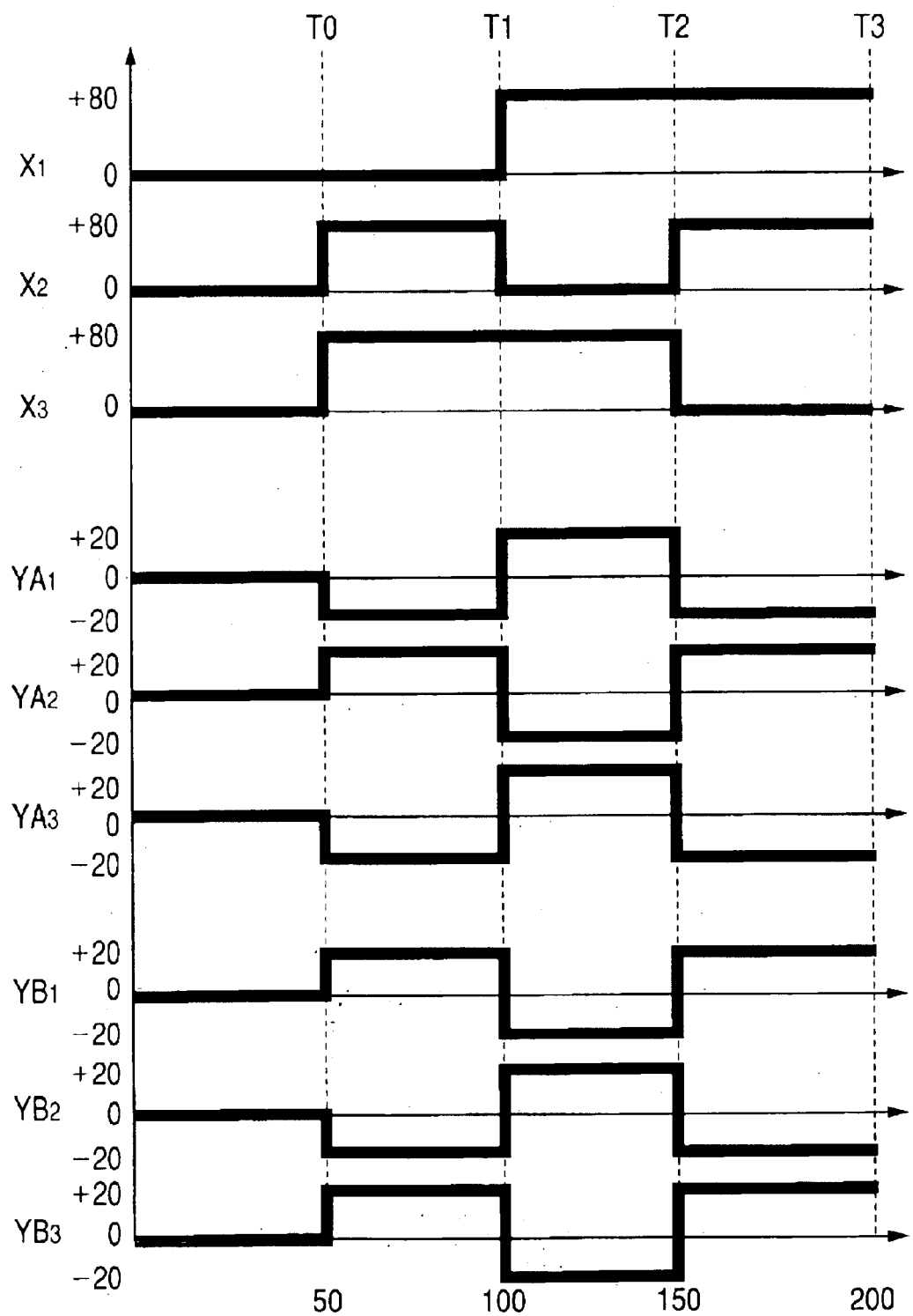
FIG. 21 is a timing chart showing the voltage application in successive reversal of 3×3 pixels arranged in a checkerboard pattern.
Figure 22A:
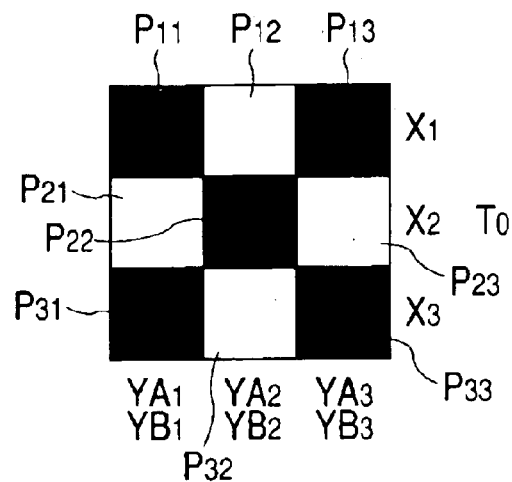
FIGS. 22A, 22B, 22C and 22D illustrate displaying states in driving in a manner as shown in FIG. 21.
Figure 22B:
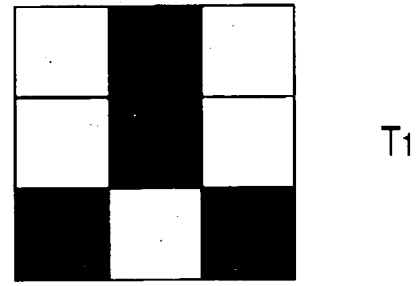
Figure 22C:
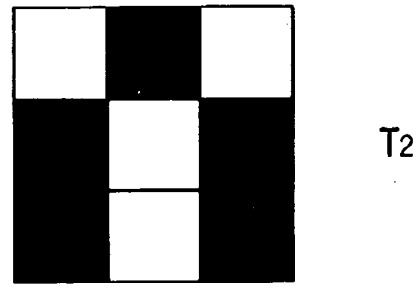
Figure 22D:
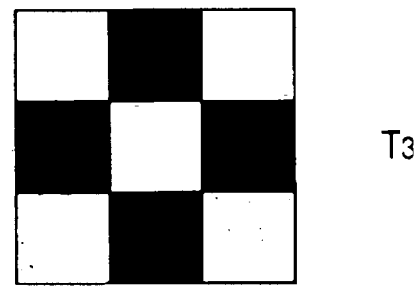

In this Example, signals were inputted as shown in FIG. 21 to display an image in a pattern shown in FIGS. 22A to 22D. FIG. 21 is a timing chart for reversing successively 3×3 pixels displaying a checker board pattern. The symbols X1, X2, and X3 indicate respectively a signal inputted through scanning lines (scanning electrode lines) X1, X2, and X3 to first control electrode 6a. The symbols YA1, YA2, and YA3 indicate respectively a signal inputted through first signal lines (first signal electrode lines) YA1, YA2, and YA3 to first display electrode 5a. The symbols YB1, YB2, and YB3 indicate respectively a signal inputted through second signal lines (second signal electrode lines) YB1, YB2, and YB3 to second display electrode 5b. In this Example, the selection periods (0–T0, T0–T1, T1–T2, and T2–T3) for one scanning line were set to 50 msec. FIGS. 22A to 22D show the display states in the driving as shown in FIG. 21: FIG. 22A, at period T0; FIG. 22B, at period T1; FIG. 22C, at period T2; and FIG. 22D, at period T3. In this Example, since two-way writing can be conducted, entire resetting is not necessary as the initial operation, which is different from Example 2. The initial pattern was as shown in FIG. 22A.

In the period T0–T1, a write-permitting signal Vc=0V is applied to a selected scanning line X1, and a write-inhibiting signal Vc=+80V was applied to non-selected line X2 and X3; a white display writing pulse Vd1=−20V, and Vd2=+20V were applied respectively to first signal lines YA1, YA3, and second signal lines YB1 and YB3 corresponding to pixels P11 and P13; a black display writing pulse Vd1=+20V, and Vd2=−20V were applied respectively to first signal line YA2, and second signal line YB2 corresponding to pixels P12; a black display writing pulse. As the results, the display states of all the pixels in selected scanning line X1 were reversed by rewriting, and the initial display states were retained in the pixels of non-selected scanning lines X2 and X3 (FIG. 22B).

Thereafter, similar driving was conducted in the periods T1–T2 and T2–T3. As the results, intended reversal display pattern was obtained with excellent contrast. In the obtained display, none of cross talk phenomenon, failure in migration of electrophoretic particles, and deterioration of contrast by failure of retention was observed, and the average contrast of white display to black display was as high as about 10:1.

EXAMPLE 2

In this Example, an electrophoretic display device was produced which has constitution shown in FIGS. 1A and 1B, and the device was driven for one-way writing by simple matrix driving.

The produced display device had 20×20 pixels, and the one pixel had a size of 120 μm×120 μm, and the ratio of the area of first display electrode 5a to the area of second display electrode 5b was 2:8.

A process for producing the electrophoretic display device of this Example is described below.

On the entire face of a PES film 1b of 180 μm thick as the second substrate, an insulating colored layer was formed from an acrylic resin containing a white pigment like alumina. Then a titanium carbide film of dark black color was formed and the film was patterned by photolithography and dry etching to form first display electrode 5a.

Then, stage 4 was formed from an epoxy resin in a thickness of 30 μm. On the surface thereof, an ITO thin film was formed by low-temperature magnetron sputtering, and the formed film was patterned by photolithography and wet etching to form first control electrode 6a. This first control electrode 6a was coated by applying an epoxy resin in a thickness of 5 μm to form a stage. On the surface thereof, an ITO thin film was formed by low-temperature magnetron sputtering, and the formed film was patterned by photolithography and wet etching to form second display electrode 5b. This second display electrode 5b was formed over the entire face of substrate 1b as shown in FIG. 5 to be common to all the pixels, differently from the one in Example 1 in which electrode 5b was formed separately for each of the pixels.

Finally, by employing second display electrode 5b as the mask, the epoxy resin as the stage material was etched by reactive dry etching with an O2 gas to form stage 4. The resulting structure had second display electrode 5b on stage 4 of 35 μm high, first control electrode 6a in a layer 5 μm below, and first display electrode 5a in a layer 30 μm below further. Then an insulating transparent layer of an acrylic resin was formed on the entire face of the structure by spin coating. Other constitution and production process were the same as in Example 1.

Figure 23:
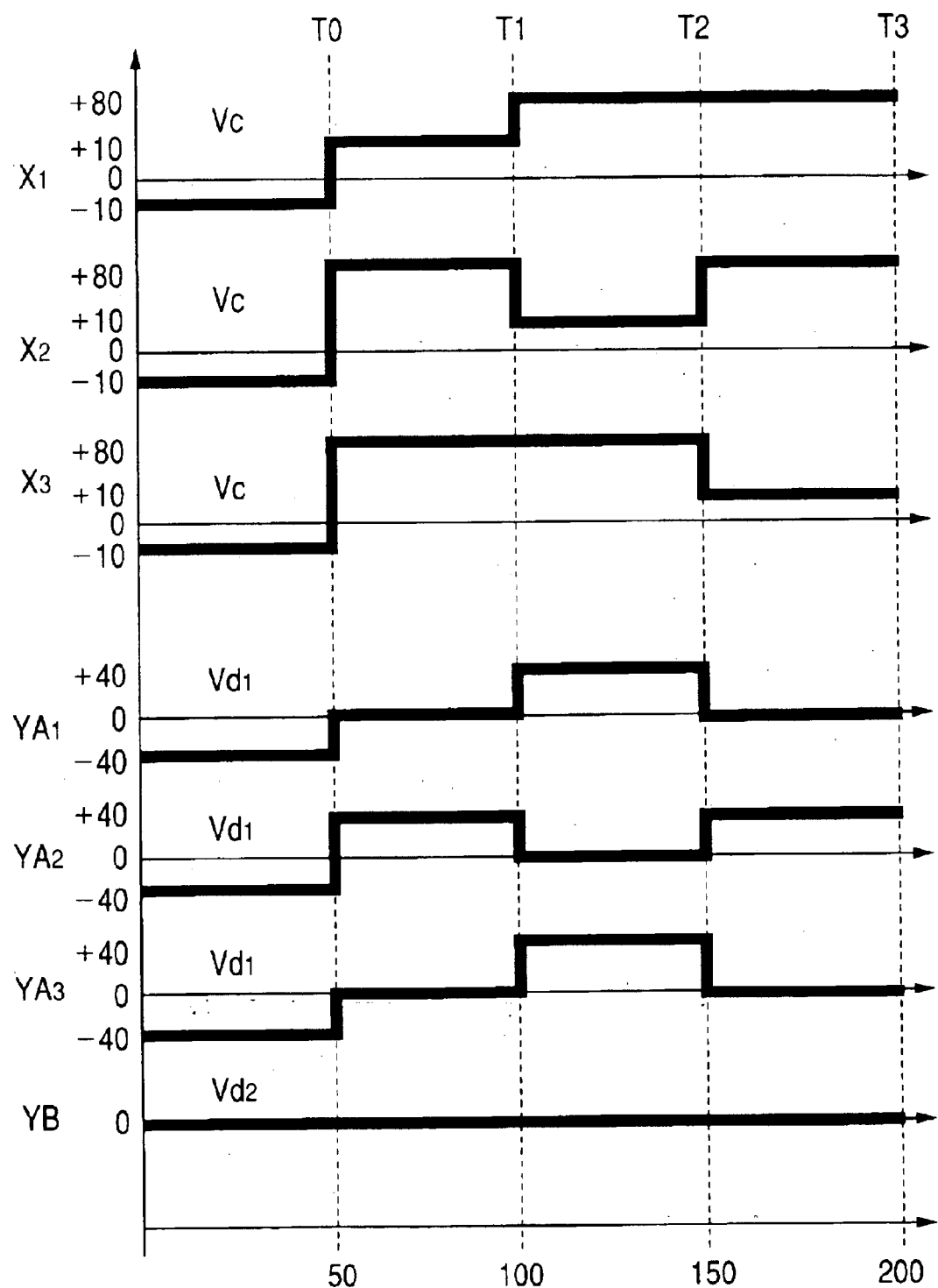
FIG. 23 is a timing chart showing the voltage application in suitable black-reversal of 3×3 pixels kept in a white color state.

The driving method in this Example is explained below by reference to FIG. 23 and FIGS. 24A to 24D. FIG. 23 is a timing chart for reversing suitably 3×3 pixels in a white-retaining state. The symbols X1, X2, and X3 indicate respectively a signal inputted through scanning lines (scanning electrode lines) X1, X2, and X3 to first control electrode 6a. The symbols YA1, YA2, and YA3 indicate respectively a signal inputted through first signal lines (first signal electrode lines) YA1, YA2, and YA3 to first display electrode 5a. The symbol YB indicates a signal inputted to second display electrode 5b. In this Example, the selection periods (0–T0, T0–T1, T1–T2, and T2–T3) for one scanning line were set to 50 msec. FIGS. 24A to 24D show the display states in driving as shown in FIG. 23: FIG. 22A, in the period T0; FIG. 22B, in the period T1; FIG. 22C, in the period T2; and FIG. 22D, in the period T3. In this Example, second display electrodes are grounded throughout the periods (in FIG. 23, YB=0)

Figure 24A:
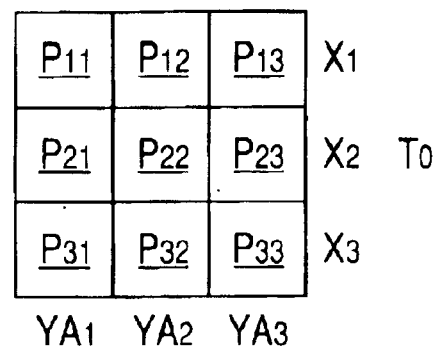
FIGS. 24A, 24B, 24C and 24D illustrate displaying states in driving in a manner as shown in FIG. 23.

In this Example, all pixels were reset as the initial operation for one-way writing. Specifically, as shown in FIG. 23 for the period 0–T0, the voltage of −10V was applied to first control electrodes 6a through all scanning lines X1, X2, and X3, and the voltage of −40V was applied to respective first display electrodes 5a through signal lines YA1, YA2, and YA3. Thereby all pixels were reset into a white state as shown in FIG. 24A.

Figure 24B:
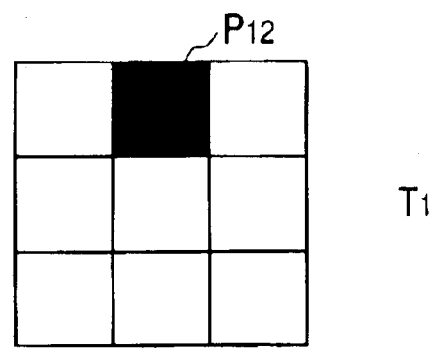
Figure 24C:
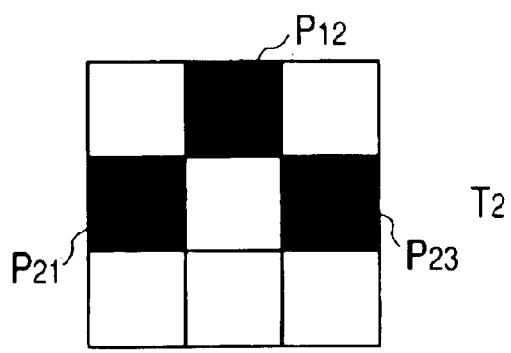
Figure 24D:
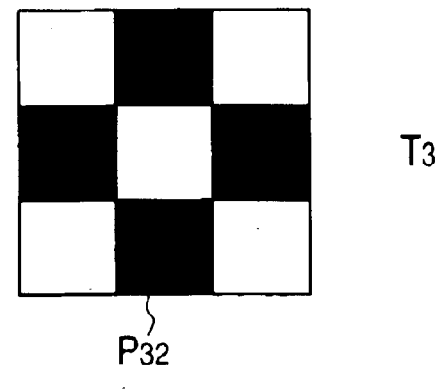

In the subsequent period T0–T1, pixel P12 in the middle of the first line only was reversed to black. Specifically, a voltage Vc=+10V was applied to first scanning line X1, and a voltage Vc=+10V was applied to other non-selected scanning lines X2 and X3. A voltage Vd1=+40V was applied to the middle signal line YA2, and Vd1=0V was applied to the other signal lines YA1 and YA3. Thereby, only pixel P12 was reversed to black to give the display state as shown in FIG. 24B. In other words, in the pixel reversed to black, first display electrode 5a had a voltage Vd1=+40V, first control electrode 6a had a voltage Vc=+10V, and second display electrode 5b had a voltage Vd2=0V.

In the subsequent period T1–T2, Pixels P21, P23 at the both ends of the second line were reversed to black, and in the following period T2–T3, pixel P32 in the middle of the third line was reversed to black.

The display state can be retained by applying the voltage Vc=+80V to first control electrode 6a.

In this Example, the intended reversed display pattern was obtained with excellent contrast. In the obtained display, none of cross talk phenomenon, failure in migration of electrophoretic particles, and deterioration of contrast by failure of retention was observed, and the average contrast of white display to black display was as high as about 12:1.

EXAMPLE 3

In this Example, an electrophoretic display device was produced which has constitution shown in FIGS. 1A and 1B, and the device was driven for one-way high-speed writing by simple matrix driving. The produced display device had 20×20 pixels, and the one pixel had a size of 120 μm×120 μm, and the ratio of the area of first display electrode 5a to the area of second display electrode 5b was 3:7.

FIG. 5 shows the shapes of first display electrodes 5a, second display electrode 5b, first control electrode 6a, hollow E2 in this Example. Other constitutions and the process of production were the same as in Example 1.

Figure 25:
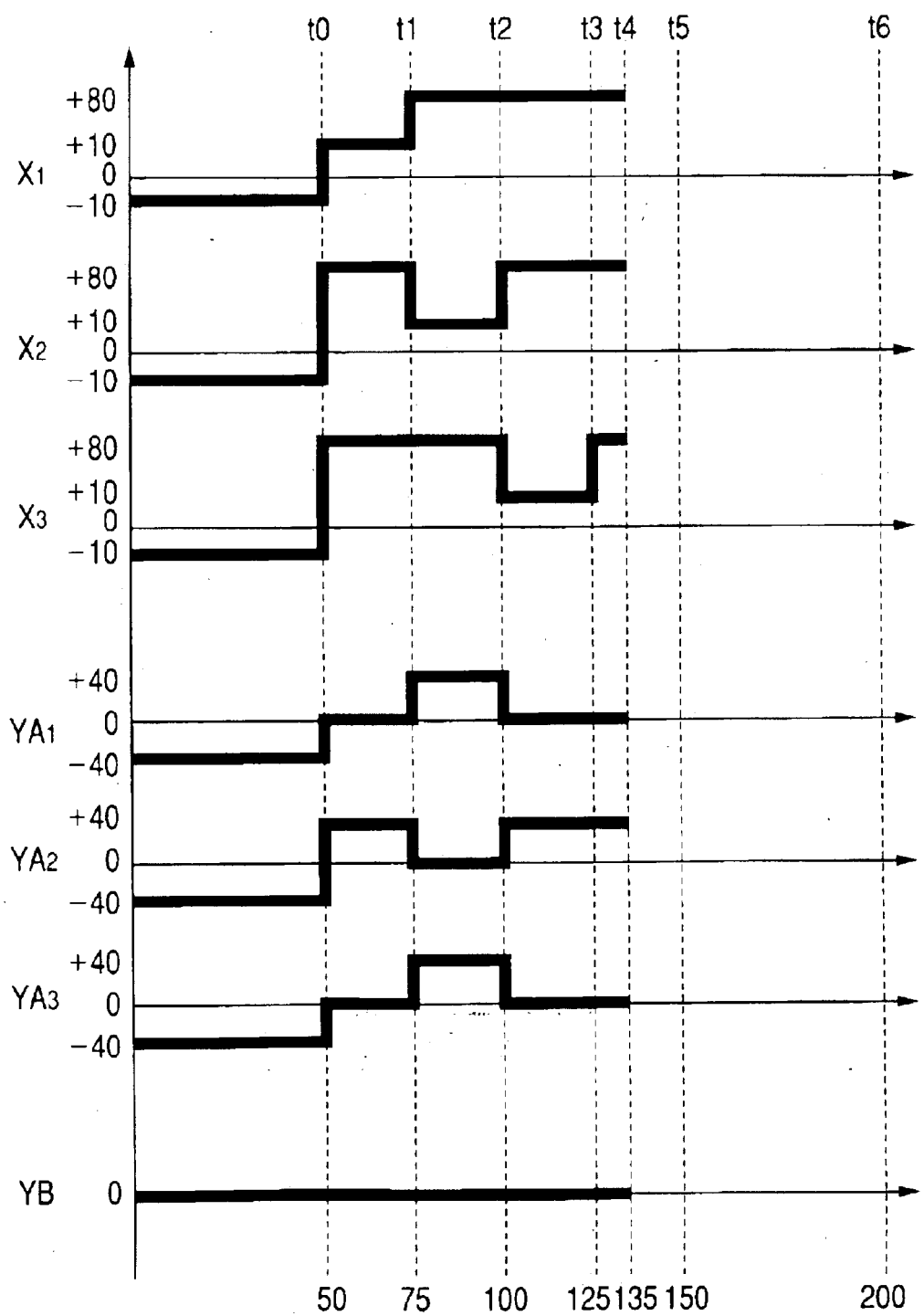
FIG. 25 is a timing chart showing the voltage application in suitable black-reversal of 3×3 pixels kept in a white color state.
Figure 26A:
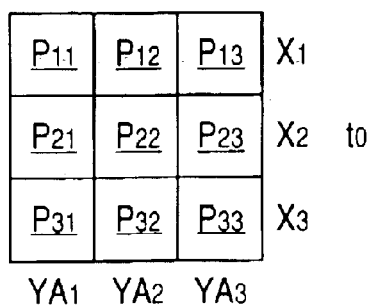
FIGS. 26A, 26B, 26C, 26D and 26E illustrate displaying states in driving in a manner as shown in FIG. 25.
Figure 26B:
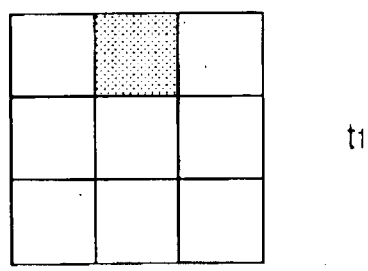
Figure 26C:
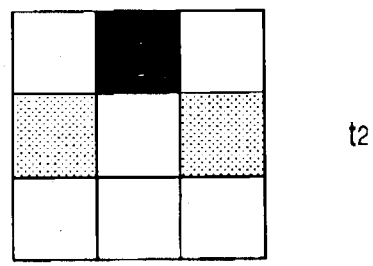
Figure 26D:
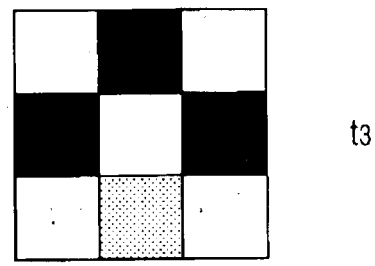
Figure 26E:
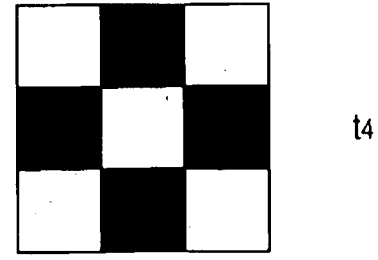
Figure 27A:
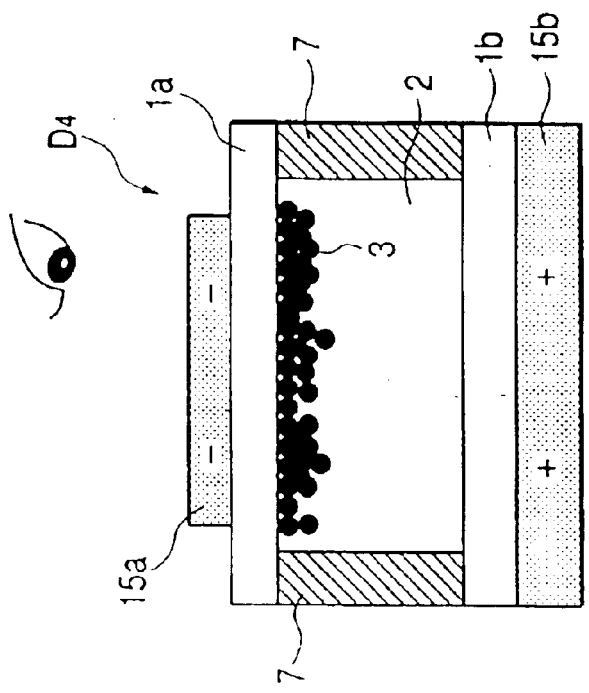
FIGS. 27A and 27B illustrate a structure of a conventional electrophoretic display unit.
Figure 27B:
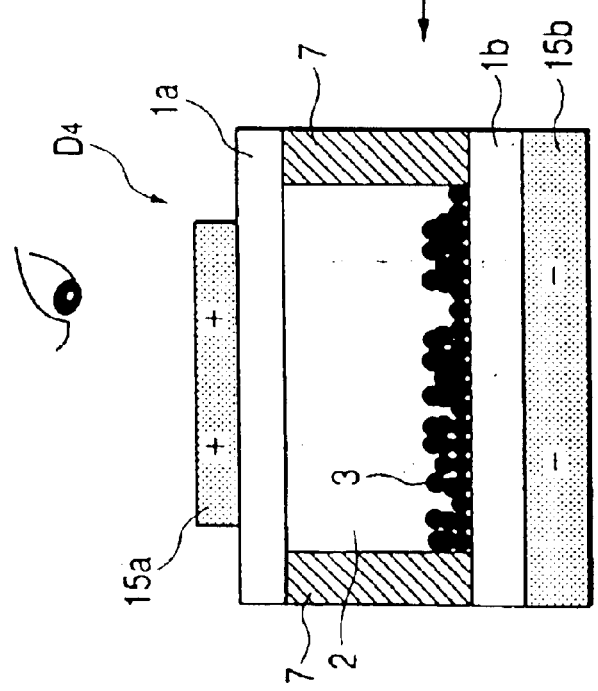

The driving method in this Example is explained below by reference to FIG. 25 and FIGS. 26A to 26E. FIG. 25 is a timing chart for reversing suitably 3×3 pixels in a white-retaining state to a black state. The symbols X1, X2, and X3 indicate respectively a signal Vc inputted through scanning lines (scanning electrode lines) X1, X2, and X3 to first control electrode 6a. The symbols YA1, YA2, and YA3 indicate respectively a signal Vd1 inputted through signal lines YA1, YA2, and YA3 to first display electrode 5a. The symbols YB indicate a signal Vd2 inputted to second display electrode 5b. In this Example, the selection periods (t0–t1, t1–t2, and t2–t3) for one scanning line were set to 25 msec. FIGS. 26A to 26E show the display states in driving as shown in FIG. 25: FIG. 26A, at the time t0; FIG. 26B, at the time t1; FIG. 26C, at the time t2; FIG. 26D, at time t3; and FIG. 26E, at time t4. In this Example, second display electrodes are grounded throughout the periods (in FIG. 25, YB=0)

In this Example, all pixels were reset as the initial operation by application of the same voltage as in Example 2 for one-way writing. Specifically, as shown in FIG. 25 for the period 0–t0, the voltage of −10V was applied to first control electrodes 6a through all scanning lines X1, X2, and X3, and the voltage of −40V was applied to respective first display electrodes 5a through signal lines YA1, YA2, and YA3. Thereby all pixels were reset into a white state as shown in FIG. 26A.

In the subsequent period t0–t1, pixel P12 in the middle of the first line only was reversed to black. Specifically, a voltage Vc=+10V was applied to first scanning line X1, and a voltage Vc=+80V was applied to other non-selected scanning lines X2 and X3. A voltage Vd1=+40V was applied to the middle signal line YA2, and Vd1=0V was applied to the other signal lines YA1 and YA3. Thereby, in pixel P12 in the middle of the first line, charged electrophoretic particles 3 migrate to the position shown in FIG. 18B (for gray display) to show the display state as shown FIG. 26B.

In the subsequent period t1–t2, the voltage Vc of scanning line X1 of the first line was changed from +10V to +80V, and the voltage Vd1 of the signal line YA2 at the middle was changed from +40V to 0V. Thereby, in pixel P12 in the middle of the first line, the migration of electrophoretic particles 3 to second display electrode 5b was accelerated to display a black color (FIG. 18C). The voltage Vc of selected scanning line X2 of the second line was changed from +80V to +10V, and the voltage Vd1=+40V was applied to first and third signal lines YA1 and YA3. Thereby, in pixels P21 and P23 at the both ends of the second line, electrophoretic particles 3 migrate to the position shown in FIG. 18B to display a gray color. The voltage Vd1 of middle signal line YA2 was changed to 0V to retain the white state in the middle pixel P22. The voltage of the third scanning line X3 was kept unchanged at +80V not to conduct rewriting. FIG. 26C shows the resulting display state.

In the periods t2–t3 and t3–t4, similar driving was conducted in accordance with the selected pixel pattern. Thereby the intended display pattern was obtained with excellent contrast. Incidentally, in the period t3–t4, in pixel P32 on the last selected line X3, electrophoretic particles 3 migrate from control electrode 6a to second display electrode 5b. In the obtained display, none of cross talk phenomenon, failure in migration of electrophoretic particles, and deterioration of contrast by failure of retention was observed, and the average contrast of white display to black display was as high as about 10:1. In comparison with Examples 1 and 2, the selection period for one line could be shortened from 50 msec to 25 msec, realizing high-speed writing.

In the present invention, in which a first control electrode is placed between the display electrodes, electrophoretic particles are smoothly allowed to migrate by application of a voltage at a suitable timing to the control electrode without remaining of the particles on the lower level surface even if the level difference between the display electrodes is large. Therefore the display contrast is not impaired.

According the present invention, the migration of the electrophoretic particles can be controlled effectively by the electric gate barrier produced by the first control electrode. Thereby the voltage applied to the control electrode can be lowered.

According to the present invention, the level difference between the display electrodes can be designed larger to hold all of the electrophoretic particles in the hollow. Therefore, the area of the first display electrode is made smaller to increase the ratio of the area of the second display electrode to the area of the first display electrode, to improve the contrast remarkably for the ratio increase.

According to the present invention, the stepped electrode arrangement makes the insulation sufficient by vertical level difference even if the display is made finer. Thereby production of fine display apparatus can be facilitated.

According to the present invention, two-way writing and high-speed writing can be realized.

According to the present invention, deterioration of display quality caused by leakage electric field from lead wiring can be prevented.

What is claimed is:

1. An electrophoretic display unit having a first substrate and a second substrate counterposed with an interspace, an insulating liquid placed in the interspace, and colored charged electrophoretic particles dispersed in the insulating liquid, and having a stage formed in the interspace along the second substrate, the stage having a first surface facing a thicker layer portion of the insulating liquid on the second substrate, a second surface facing a thinner layer portion of the insulating liquid, and a side wall surface of the stage connecting the first surface and the second surface, a first display electrode placed along the first surface, a second display electrode placed along the second surface, and a third electrode placed under the second electrode, wherein an end portion of the third electrode is proximate to the side wall surface at a substantially constant distance from the first electrode and the second electrode.

2. The electrophoretic display unit according to claim 1, wherein at least a part of the third electrode is overlaid with the second electrode viewed perpendicularly from the second substrate.

3. The electrophoretic display unit according to claim 2, wherein the entire third electrode is overlaid with the second electrode.

4. The electrophoretic display unit according to claim 2, wherein the third electrode has a portion not overlaid with the second electrode, the portion occupying a boundary area between the area of the first electrode and the area of the second electrode viewed perpendicularly from the second substrate.

5. The electrophoretic display unit according to claim 1, wherein a fourth electrode is placed on the first substrate in opposition to the first electrode and the second electrode.

6. A driving method for driving the electrophoretic display unit set forth in claim 5, wherein a process for switching the display state comprises the steps of:

impelling the charged electrophoretic particles from one of the first electrode and the second electrode toward the third electrode; and impelling the charged electrophoretic particles having migrated to the vicinity of the third electrode in the first step to the opposite one of the first electrode and the second electrode, wherein the potential of the third electrode in the first step is set to be intermediate between the potential of the first electrode and the potential of the second electrode, the potential of the third electrode in the second step is set to be higher or lower than the potential of the third electrode in the first step, depending on the polarity of the charged electrophoretic particles, and the potential of the fourth electrode is set to be intermediate between the potential of the first electrode and the potential of the second electrode.

7. The electrophoretic display unit according to claim 1, wherein a set of states of display comprises a first state in which the electrophoretic particles are accumulated on the first surface and a second state in which the electrophoretic particles are developed on the second surface.

8. The electrophoretic display unit according to claim 7, wherein the distance between the first surface and the third electrode is set to allow the charged electrophoretic particles to accumulate between the first surface and the third electrode.

9. The electrophoretic display unit according to claim 7, wherein the unit further comprises means for applying a voltage to the first to third electrodes, and the state of the display is switched by migration of the electrophoretic particles between the first surface and the second surface by application of voltages by the means for applying voltage to the first to third electrodes.

10. The electrophoretic display unit according to claim 9, wherein the unit further comprises control means for controlling the voltage applied to the third electrode, and the state of the display is switched, during the time in which the voltages are applied to the first electrode and the second electrode to be capable of causing migration of the electrophoretic particles, by controlling the potential of the third electrode to be intermediate between the potential of the first electrode and the potential of the second electrode to allow the charged electrophoretic particles to migrate, and controlling the potential of the third electrode to be higher or lower than the potentials of both the first electrode and the second electrode depending on the polarity of the charged electrophoretic particles to inhibit the migration of the charged electrophoretic particles.

11. The electrophoretic display unit according to claim 1, wherein a level difference caused by the stage is 2 to 140 times the particle diameter of the electrophoretic particles.

12. The electrophoretic display unit according to claim 1, wherein the ratio of the area of the first surface to the area of the second surface is not larger than 3:7.

13. The electrophoretic display unit according to claim 1, wherein the second electrode is formed to cover the display area except the area occupied by the first electrode, and lead wirings to the first to third electrodes are shielded not to affect electrically the region where the charged electrophoretic particles exist.

14. The electrophoretic display unit according to claim 1, wherein the second electrode is formed in one body common to plural pixels.

15. A driving method for driving the electrophoretic display unit set forth in claim 1, wherein a process for switching the display state comprises the steps of:

impelling the charged electrophoretic particles from one of the first electrode and the second electrode toward the third electrode; and impelling the charged electrophoretic particles having migrated to the vicinity to of the third electrode in the first step to the opposite one of the first electrode and the second electrode.

16. The driving method for driving the electrophoretic display unit according to claim 15, wherein, in the switching process, the potential of the third electrode in the first step is set to be intermediate between the potential of the first electrode and the potential of the second electrode, and the potential of the third electrode in the second step is set to be higher or lower than the potential of the third electrode in the first step, depending on the polarity of the charged electrophoretic particles.

* * * * *

UNITED STATES PATENT AND TRADEMARK OFFICE
CERTIFICATE OF CORRECTION

PATENT NO. : 6,822,783 B2
DATED : November 23, 2004
INVENTOR(S) : Yojiro Matsuda It is certified that error appears in the above-identified patent and that said Letters Patent is hereby corrected as shown below:

<u>Column 9,</u>
Line 50, "6a" should read -- 6a is formed first, and then the second display electrode --.

<u>Column 24,</u>
Line 5, "mid" should read -- and --.
Line 18, "an O2" should read -- $O_2$ --.

<u>Column 25,</u>
Line 58, "an O2" should read -- $O_2$ --.

Signed and Sealed this

Eleventh Day of October , 2005

JON W. DUDAS
*Director of the United States Patent and Trademark Office*